(12) United States Patent
Ito

(10) Patent No.: US 11,104,275 B2
(45) Date of Patent: Aug. 31, 2021

(54) FOLDABLE HOLDING DEVICE

(71) Applicant: Yuzuru Ito, Plymouth, MI (US)

(72) Inventor: Yuzuru Ito, Plymouth, MI (US)

( * ) Notice: Subject to any disclaimer, the term of this patent is extended or adjusted under 35 U.S.C. 154(b) by 223 days.

(21) Appl. No.: 16/357,948

(22) Filed: Mar. 19, 2019

(65) Prior Publication Data

US 2019/0291649 A1 Sep. 26, 2019

Related U.S. Application Data

(60) Provisional application No. 62/647,823, filed on Mar. 25, 2018, provisional application No. 62/646,367, filed on Mar. 22, 2018.

(51) Int. Cl.
*B60R 7/02* (2006.01)
*B60R 5/04* (2006.01)

(52) U.S. Cl.
CPC ............... *B60R 7/02* (2013.01); *B60R 5/045* (2013.01)

(58) Field of Classification Search
CPC .... B60R 7/02; B60R 5/04; B60R 9/00; B60R 5/045; B60R 7/04; B60R 7/043; B60R 11/02; B60R 2011/0007
USPC ... 296/37.5, 37.16, 156, 1.07, 24.33, 70, 67, 296/66, 183.1; 224/404, 549, 497, 498, 224/542, 499, 929, 926, 906
See application file for complete search history.

(56) References Cited

U.S. PATENT DOCUMENTS

| | | | |
|---|---|---|---|
| 3,904,106 A * | 9/1975 | Elder | B65D 5/2076 229/149 |
| 4,091,852 A | 5/1978 | Jordan et al. | |
| 4,718,584 A | 1/1988 | Schoeny | |
| 4,781,300 A | 11/1988 | Long | |
| 4,871,100 A | 10/1989 | Posner | |
| 5,472,107 A | 12/1995 | Lieber | |
| 5,918,798 A | 7/1999 | Frahm | |
| 6,015,071 A | 1/2000 | Adomeit et al. | |
| 6,056,177 A | 5/2000 | Schneider | |
| 6,254,162 B1 | 7/2001 | Faber et al. | |
| 6,290,277 B1 | 9/2001 | Spykerman et al. | |
| 6,308,873 B1 | 10/2001 | Baldas et al. | |

(Continued)

FOREIGN PATENT DOCUMENTS

| | | |
|---|---|---|
| DE | 10108338 A1 | 8/2002 |
| DE | 10110335 A1 | 9/2002 |

(Continued)

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

A foldable holding device provided in a floorboard of a luggage compartment includes: a housing member that is provided at the floorboard; a raisable pair of top panels that nests within the housing member in a housed state, the top panels stand when the top panels are outwardly opened; and a pair of side panels foldably connected to the side edges of each of the top panels, the side panels being configured to outwardly move as the top panels are raised and to form, together with the top panels, a cross section of an open state of the foldable holding device being an inverted trapezoid. Part of a lower edge of one of the side panels is located at an outer side of a line connecting ends of the lower edges of the top panels with respect to the housing member in the plan view in the open state.

40 Claims, 24 Drawing Sheets

(56) References Cited

U.S. PATENT DOCUMENTS

| | | |
|---|---|---|
| 6,588,652 B2 | 7/2003 | Cai |
| 7,201,421 B2 | 4/2007 | Reynolds et al. |
| 8,215,693 B2 | 7/2012 | Ulita |
| 8,651,309 B2 | 2/2014 | Gualersi et al. |
| 8,789,715 B2 | 7/2014 | Shea et al. |
| 9,381,865 B2 | 7/2016 | Kmita et al. |
| 9,623,804 B2 | 4/2017 | Warnecke |
| 9,932,143 B2 | 4/2018 | Henderson et al. |
| 10,106,090 B2 | 10/2018 | Ito |
| 2005/0087530 A1 | 4/2005 | Svenson |
| 2006/0038423 A1* | 2/2006 | Nilsrud .................... B60R 7/02 296/37.5 |
| 2007/0241154 A1* | 10/2007 | Potts ........................ B60R 7/02 224/539 |
| 2015/0175080 A1 | 6/2015 | Kmita et al. |
| 2016/0144800 A1* | 5/2016 | Henderson ................ B60R 7/02 296/24.4 |
| 2016/0229347 A1 | 8/2016 | Warnecke |
| 2017/0129410 A1 | 5/2017 | Ito |
| 2017/0291733 A1* | 10/2017 | Henderson ......... B65D 11/1873 |

FOREIGN PATENT DOCUMENTS

| | | |
|---|---|---|
| DE | 10-2012-004183 A1 | 9/2013 |
| EP | 0983902 A2 | 3/2000 |
| JP | S60-052139 U | 4/1985 |

* cited by examiner k-k' m-m' aa-aa' dd-dd' bb-bb' ee-ee' cc-cc'

FOLDABLE HOLDING DEVICE

CROSS-REFERENCE TO RELATED APPLICATION

This application claims priority to Provisional Patent Application Nos. 62/646,367 filed Mar. 22, 2018, and 62/647,823 filed Mar. 25, 2018 which are hereby expressly incorporated by reference herein in their entirety.

BACKGROUND

The present invention relates to a foldable holding device in or on a floorboard or in a back side of a seat used in a trunk or luggage compartment of a vehicle.

Conventionally, for example, as described in Japanese Utility Model Publication No. S60-52139, in regards to a foldable holding device being used in a trunk or a luggage compartment of an automobile, the foldable holding device is known. A rectangular hole is cut out in a carpet body. The foldable holding device is configured by a box-shaped container that is formed by connecting both side edges of compartment walls fitted in a locations facing that hole by a flexible material.

However, the conventional foldable holding device uses the flexible material. Although it is convenient for folding and suitable for storage, its strength is poor when the box-shaped container is formed by raising the compartment walls. Therefore, there is a problem in which luggage or goods cannot be sufficiently held because a load of luggage is imposed such as at acceleration, deceleration and direction changes of a vehicle.

On the other hand, when the flexible material parts are also composed of the compartment walls, the adjacent compartment walls must be fastened to each other with hooks or the like in order to make the four sides of the compartment walls maintain a raised position (a raised state). As a result, it becomes bothersome to assemble the compartment walls into a container shape (the foldable holding device).

Further, although there is also another method of storing the luggage or goods by stretching a net in a trunk or a luggage compartment of an automobile, there is a problem in which it becomes difficult to load and unload the luggage or goods, and its capacity is small.

SUMMARY

The present invention attempts to solve these problems. An object of the present invention is to provide a foldable holding device that is easily raisable so as to be in a container-shaped state and the container-shaped state can certainly be maintained.

In order to achieve the above object, one aspect of the present invention is directed to a foldable holding device provided in or on a floorboard of a luggage compartment, or provided in a seat back of a seat. The foldable holding device includes: a housing member that is provided at the floorboard; a raisable pair of top panels that nests within the housing member in a housed position (housed state or folded state), the top panels stand when the top panels are outwardly opened; and a pair of side panels foldably connected to the side edges of each of the top panels, the side panels being configured to outwardly move as the top panels are raised and to form, together with the top panels, an open state of the foldable holding device. Part of a lower edge of one of the pair of side panels is located at an outer side of a line connecting ends of the lower edges of the raisable pair of top panels with respect to the housing member in the plan view in the open state. The part of the lower edge of one of the pair of side panels abuts the housing member in the open state. The lower edge of the one of the pair of side panels is configured with at least two line segments and the two line segments extend in different directions. A top periphery of the foldable holding device in the open state formed by upper edges of the top panels and upper edges of the side panels is a polygon with five or more vertices.

Another aspect of the present invention is directed to a foldable holding device that can be provided on a floorboard so that the foldable holding device is detachable to the floorboard. The foldable holding device includes: a housing member that is detachably provided on the floorboard; a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and a pair of side panels foldably connected to the side edges of each of the raisable pair of top panels, the pair of side panels being configured to outwardly move as the raisable pair of top panels are raised and to form, together with the raisable pair of top panels, an open state of the foldable holding device. Part of a lower edge of one of the pair of side panels is located at an outer side of a line connecting ends of the lower edges of the raisable pair of top panels with respect to the housing member in the plan view in the open state. The part of the lower edge of one of the pair of side panels abuts the housing member in the open state. The lower edge of the one of the pair of side panels is configured with at least two line segments and the two line segments extend in different directions. A top periphery of the foldable holding device in the open state formed by the upper edges of the raisable pair of top panels and upper edges of the pair of side panels is a polygon with five or more vertices.

The foldable holding device has other features described in the above one aspect except this detachable feature.

According to the configuration explained above with respect to another aspect, when the holding device (body) is configured to be attachable and detachable to a floorboard, the holding device can be removed when not necessary. Further, it is convenient because it can be attached to an arbitrary place on the floorboard when needed. On the other hand, when the holding device body is integrally configured to the floorboard as the above one aspect, it is easy to secure more rigidity.

Yet another aspect of the present invention is directed to a foldable holding device that can be provided in a seat back of a seat. The foldable holding device includes: a housing member that is detachably provided on the floorboard; a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and a pair of side panels foldably connected to the side edges of each of the raisable pair of top panels, the pair of side panels being configured to outwardly move as the raisable pair of top panels are raised and to form, together with the raisable pair of top panels, an open state of the foldable holding device. Part of a lower edge of one of the pair of side panels is located at an outer side of a line connecting ends of the lower edges of the raisable pair of top panels with respect to the housing member in the plan view in the open state. The part of the lower edge of one of the pair of side panels abuts the housing member in the open state. The lower edge of the one of the pair of side panels is configured with at least two line segments and the two line segments extend in different directions. A top periphery of the foldable holding device in the open state formed by the upper edges of the raisable pair of top panels and upper edges of the pair of side panels is a polygon with five or more vertices.

DESCRIPTION OF EXEMPLARY EMBODIMENTS

Embodiments of the present invention will be explained below with reference to the drawings.

First Embodiment

Figure 1:
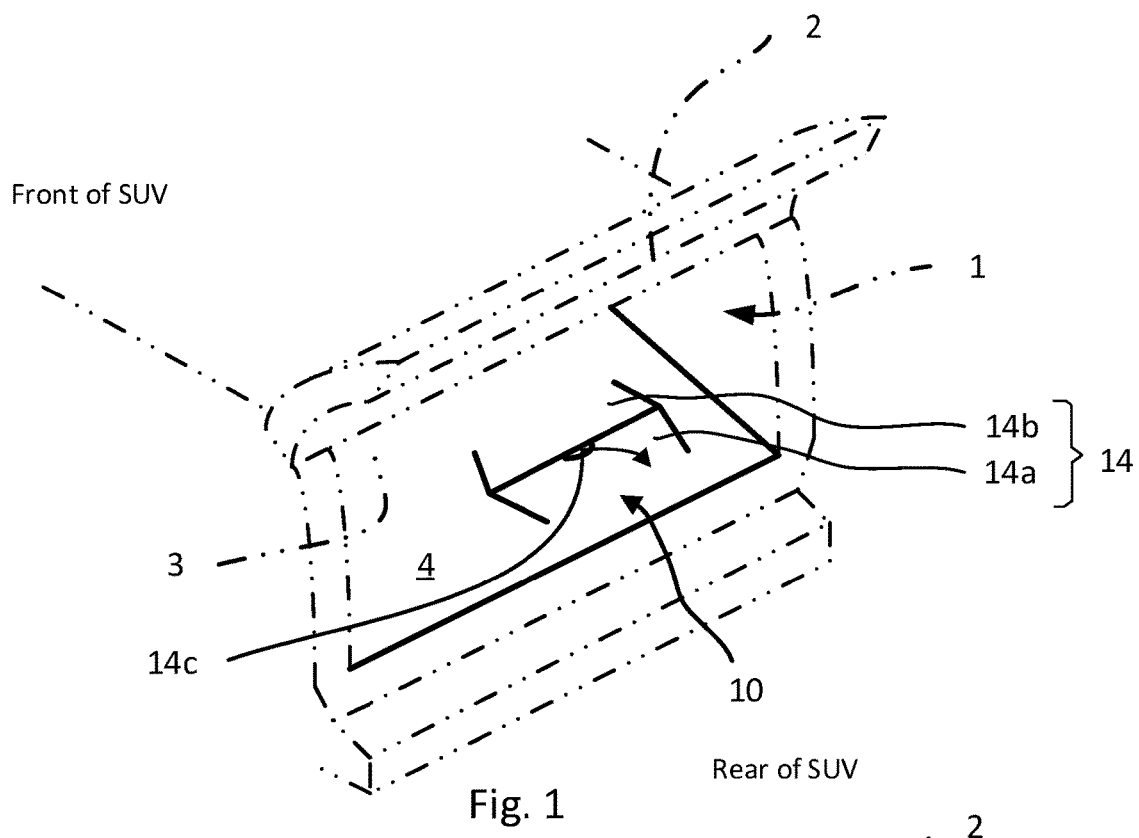
FIG. 1 is a perspective view that shows a luggage compartment in which a floorboard having a foldable holding device housed in the floorboard in a folded state (housed state) is provided according to a first embodiment of the present invention.
Figure 2:
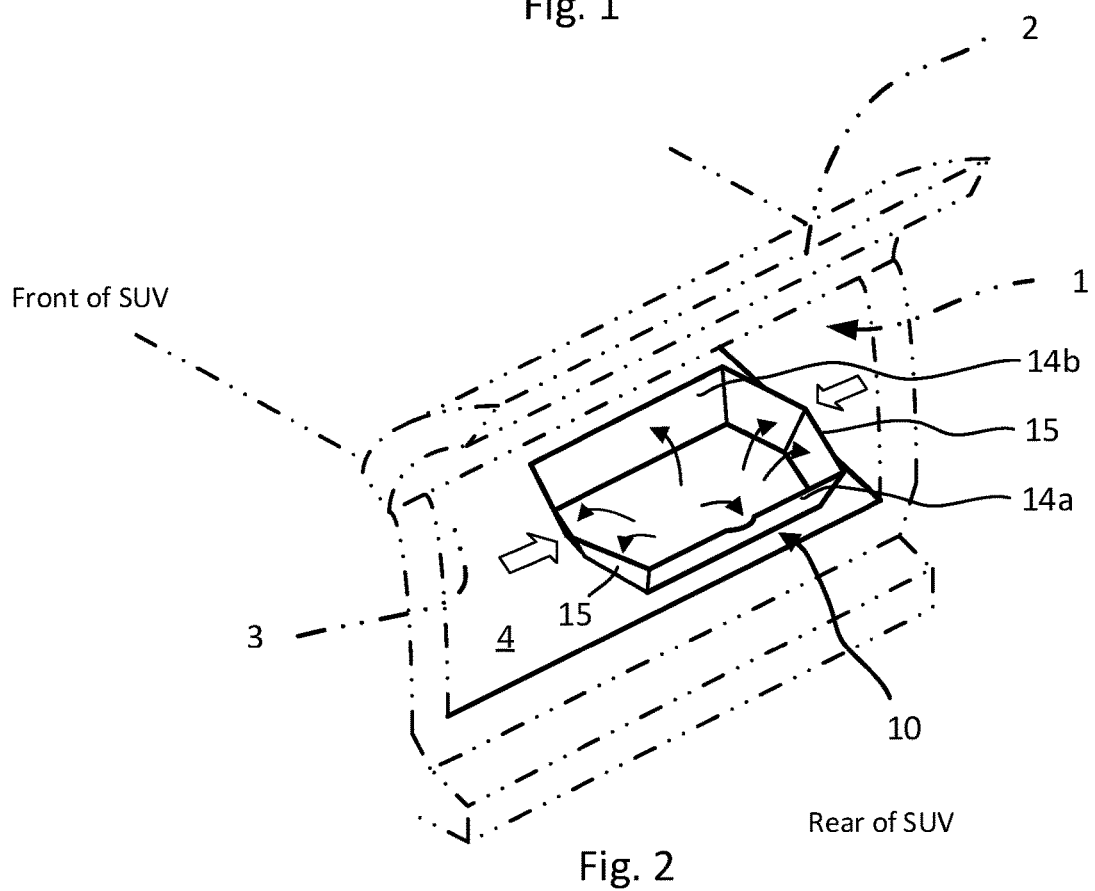
FIG. 2 is a perspective view that shows the luggage compartment in which the floorboard having the foldable holding device raised in the floorboard in a raised state (open state) is provided according to the first embodiment of the present invention.

FIG. 1 is a perspective view that shows a luggage compartment 1 in which a floorboard 4 having a foldable holding device (simply referred to as "holding device") 10 in a folded state (housed state) is provided according to a first embodiment of the present invention. FIG. 2 is a perspective view that shows the holding device 10 shown in FIG. 1 in a raised stat (open state) in which the holding device 10 is in a substantially hexagonal shape in a plan view. For example, the floorboard 4 is detachably and attachably (detachably) accommodated to a floor 3. The floor 3 can be seen when a trunk lid 2 of the luggage compartment 1 of an automobile is opened. Although an illustration is omitted from the drawings, by lifting the floorboard 4, it is possible to remove a spare tire housed in the floor 3 which is made of, for example, a metal. Furthermore, the floorboard 4 can be made so that it can be attachable and detachable or it can also be fixed to the floor 3. In regards to the automobile, it is not limited such as a sedan, a SUV, a station wagon, or a mini-van.

Figure 6:
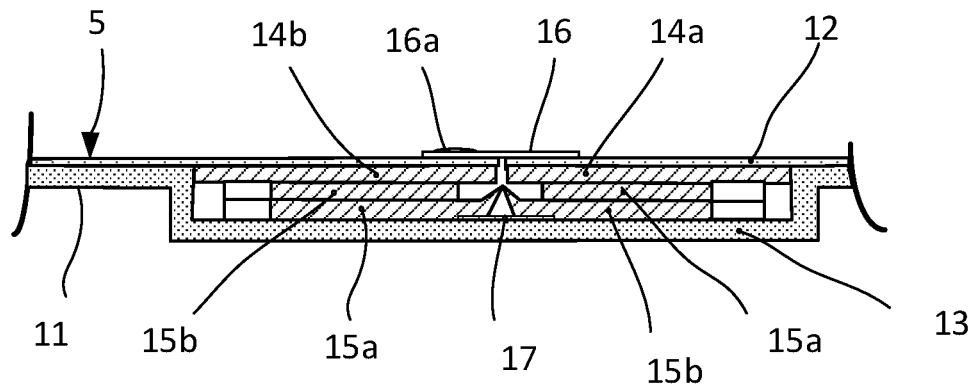
FIG. 6 is a cross section view that shows the foldable holding device in the folded state along the VI-VI line shown in FIG. 3.

As shown in FIG. 6, for example, the floorboard 4 has a floorboard body 5 that is configured with a core material 11 being made from such as a molded resin component and a carpet material 12 that is attached to the core material 11. For example, the carpet mater as an adhesive or a glue.

Figure 14:
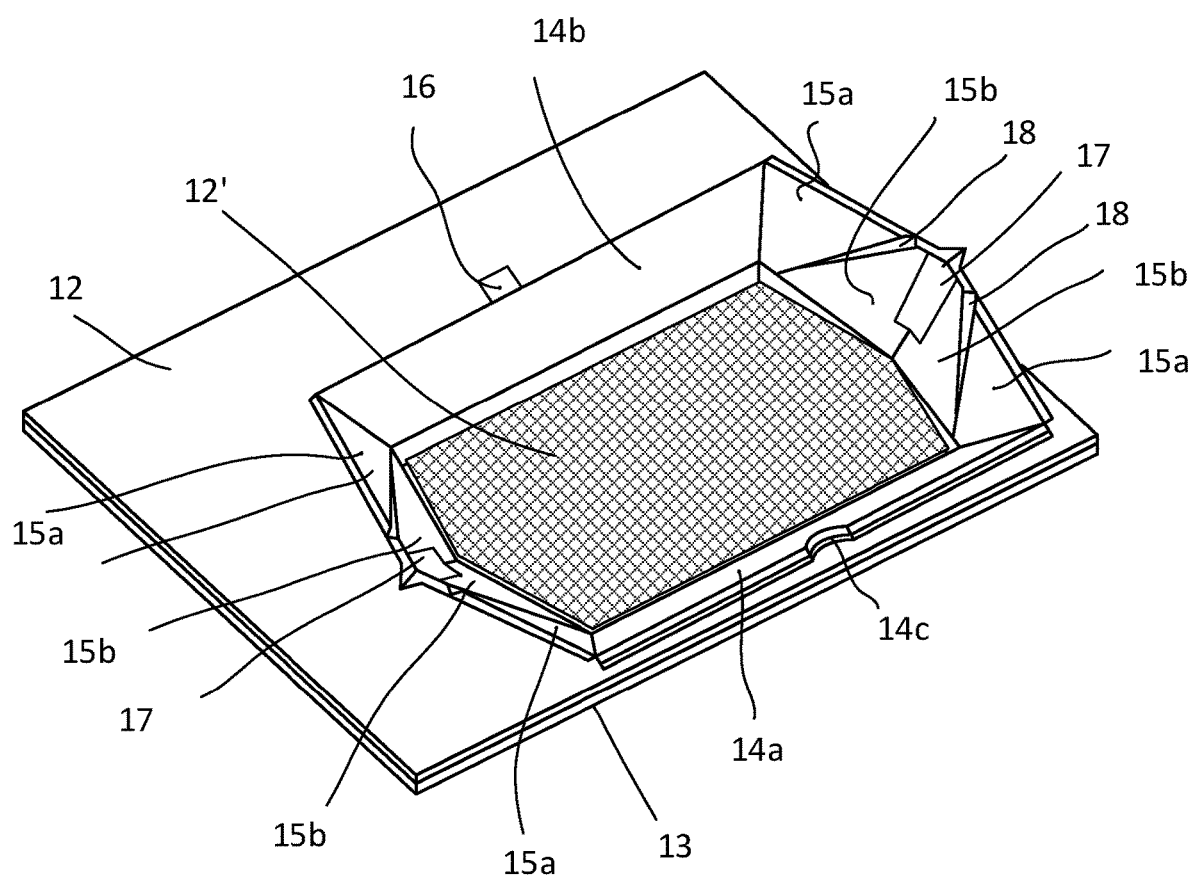
FIG. 14 is a perspective view corresponding to FIG. 5 according to a first variation of the first embodiment of the present invention.
Figure 15:
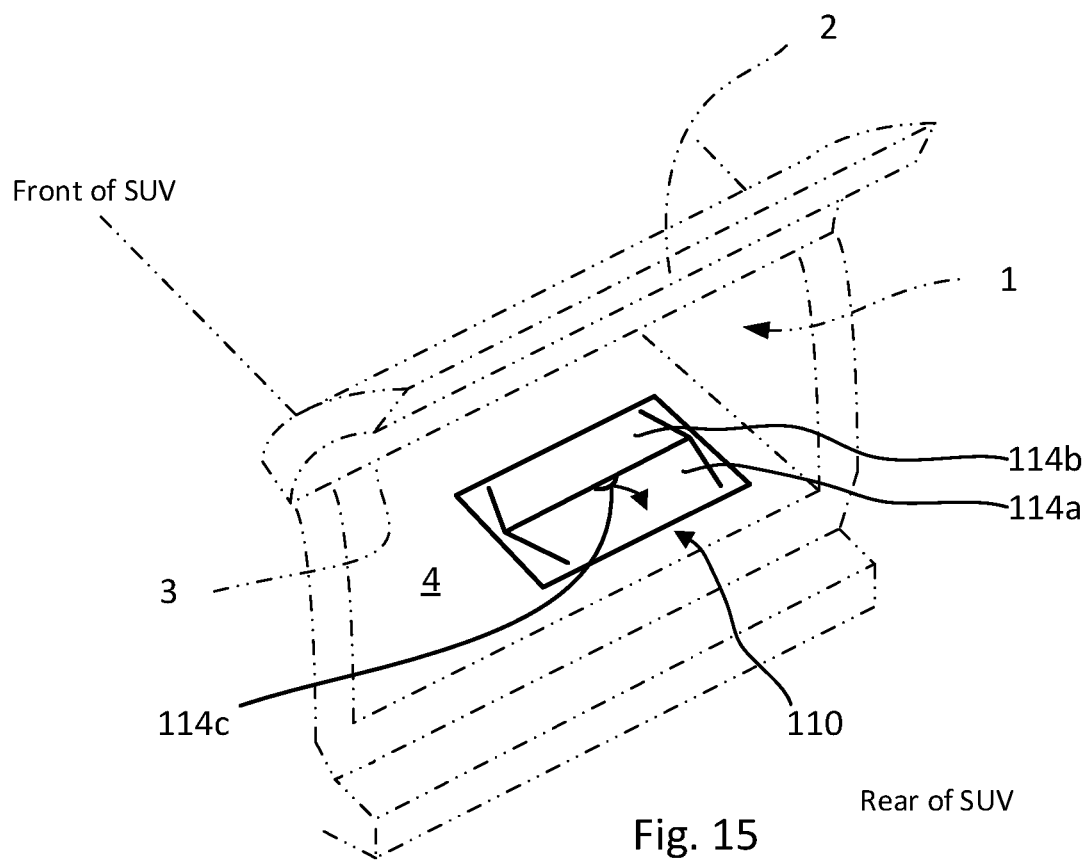
FIG. 15 is an enlarged perspective view that shows a foldable holding device in a folded state (housed state) according to a second embodiment of the present invention.
Figure 16:
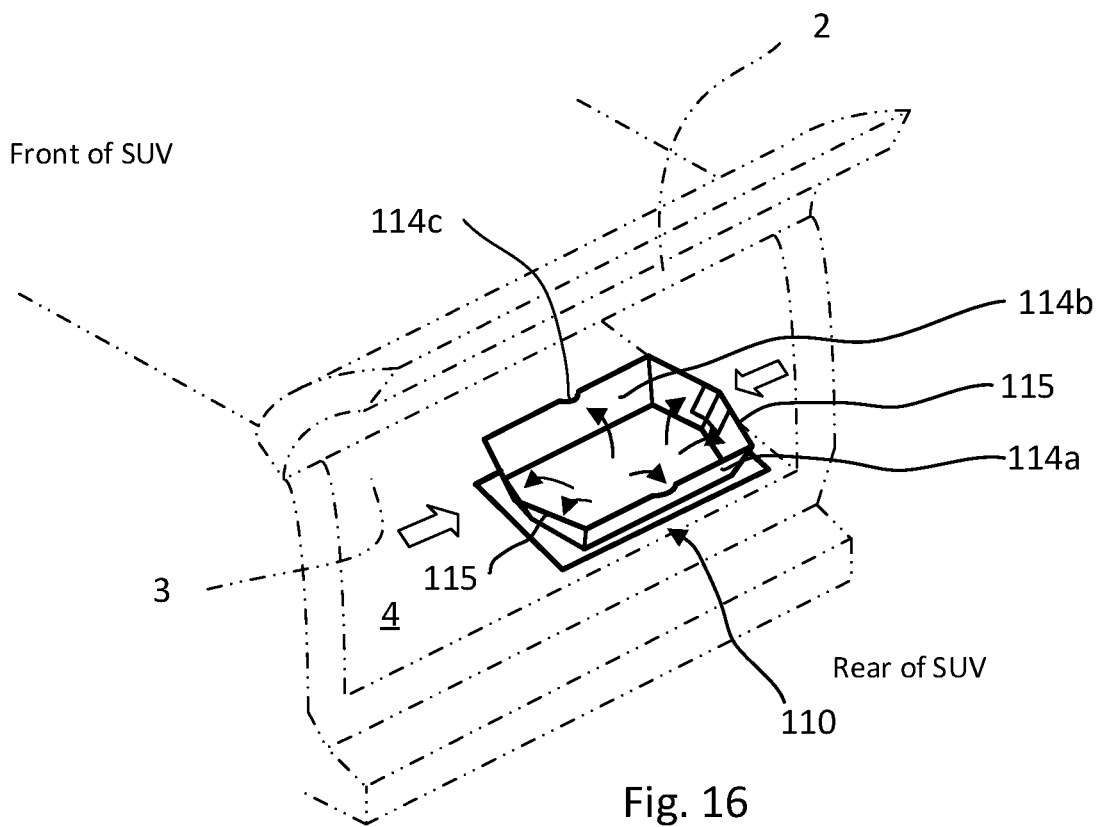
FIG. 16 is an enlarged perspective view that shows the foldable holding device in a raised state (open state) according to the second embodiment of the present invention.
Figure 17A:
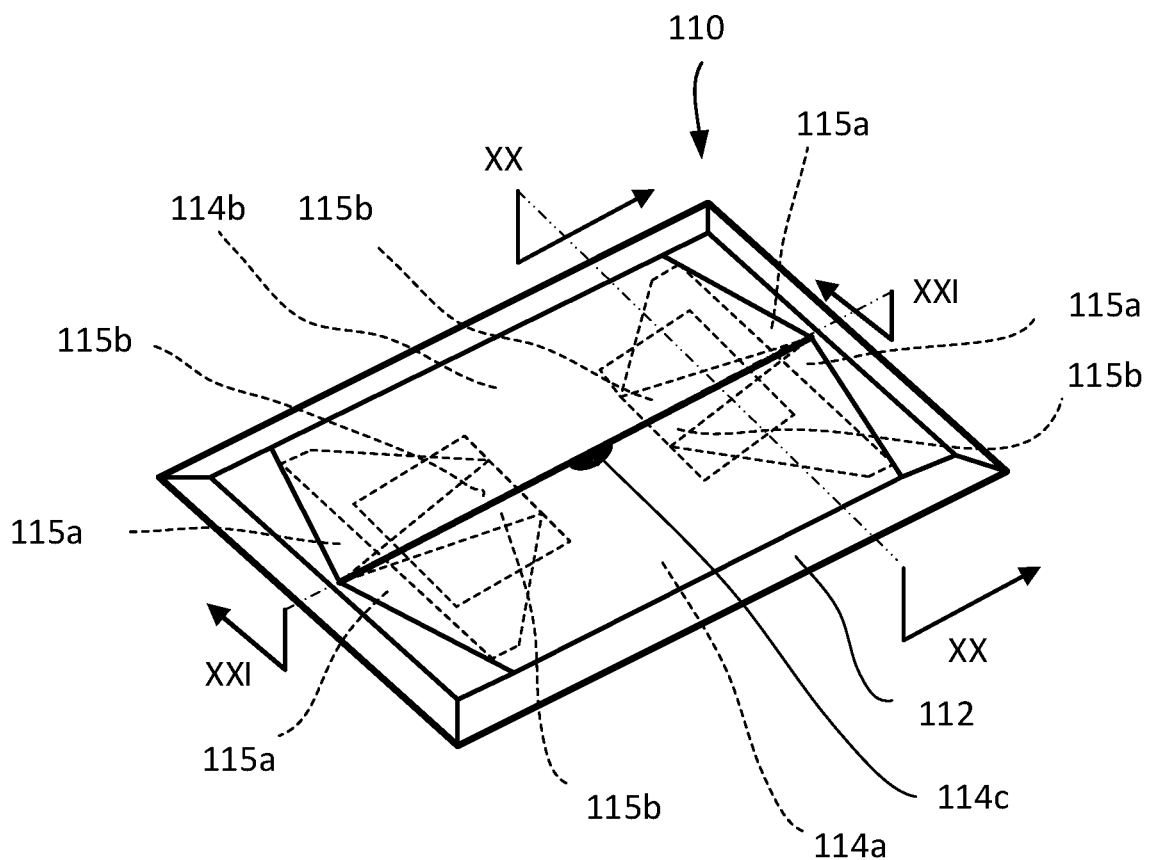
FIG. 17A is an enlarged perspective view that shows the foldable holding device in the folded state according to the second embodiment of the present invention.
Figure 17B:
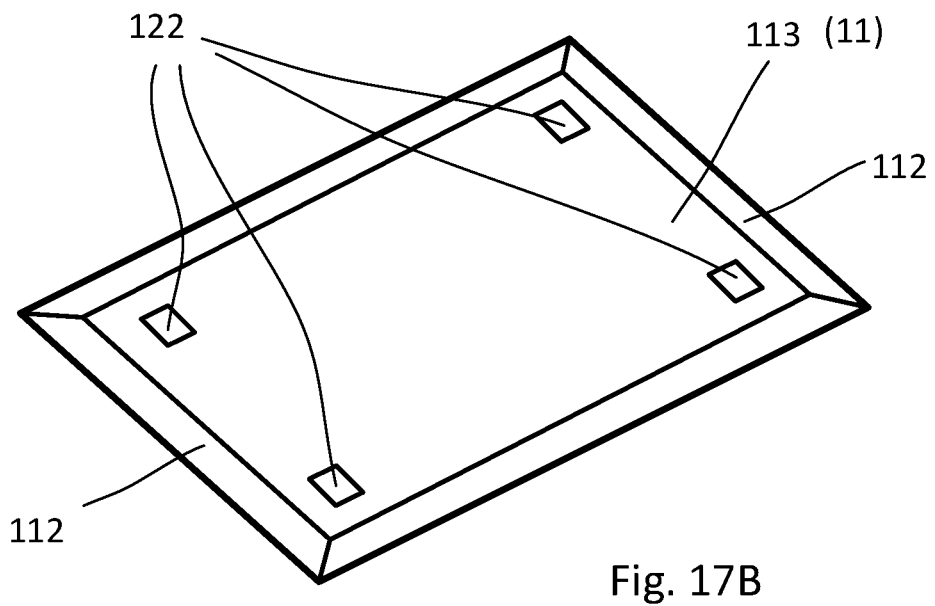
FIG. 17B is a perspective view that shows the foldable holding device in the folded state when viewed from a bottom side according to the second embodiment of the present invention.
Figure 18:
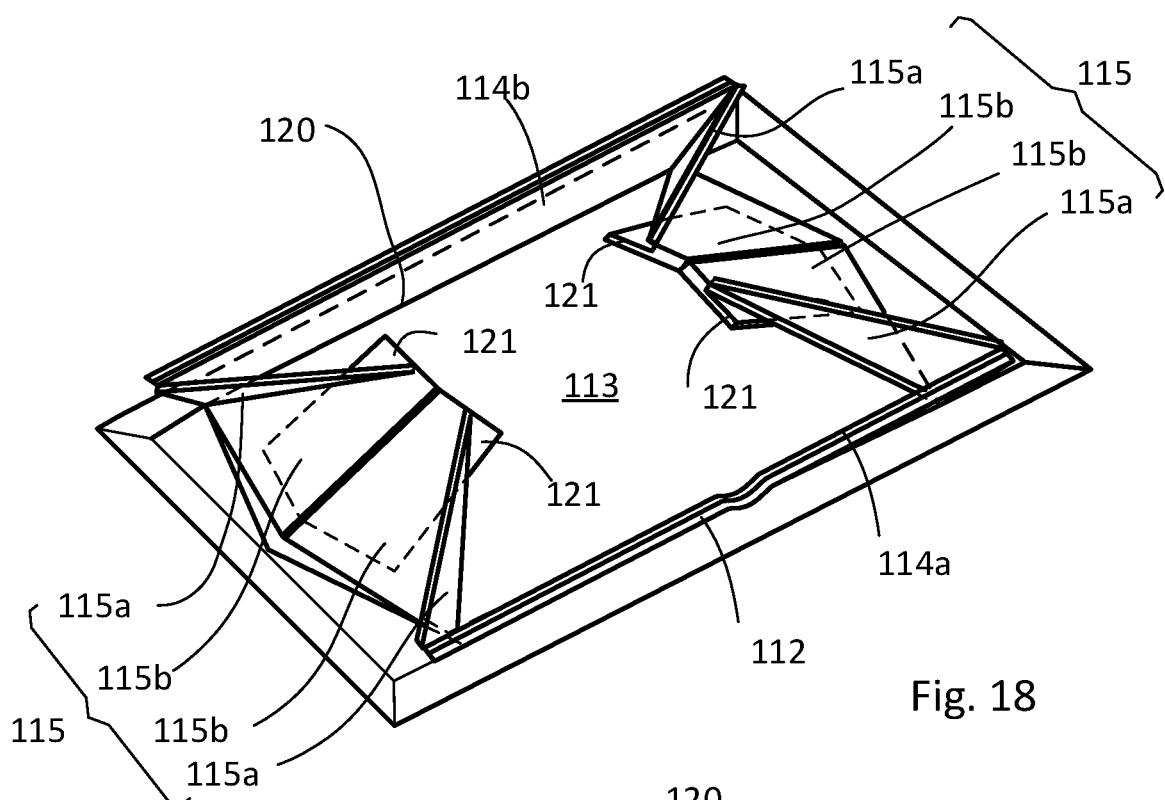
FIG. 18 is an enlarged perspective view that shows the foldable holding device in a half-raised state according to the second embodiment of the present invention.

The core material 11 is, for example, composed of a member that has relatively a high rigidity and a light-weight such as a resin molding product in which a thickness is about 12 mm, and that is substantially tabular which can be fitted into the luggage compartment 1. At its back edge, for example, a housing member (recess) 13 is formed in the core material 11 recessed one step below the other areas thereof. The housing member (recess) 13 is, for example, in a hexagonal shape in a plan view and can also be in such an octagon shape as long as it is a polygon having (with) six or more vertices (or sides). At an inner bottom of the housing member (recess) 13, the core material 11 can be exposed, or as shown in a lattice pattern (grid shape) hatching in FIG. 14 according to a first variation of the present invention, the core material 11 at the inner bottom can also be covered by a fabric material (fabric sheet or cloth (sheet)) such as a carpet material 12' for securing the luggage protection and the noise control of the holding device 10. The carpet material 12' can be the same as the carpet material 12 of the floorboard 4. Alternatively, the carpet material 12' can be another fabric material (fabric sheet or cloth (sheet)) that is different from the carpet material 12.

Figure 3:
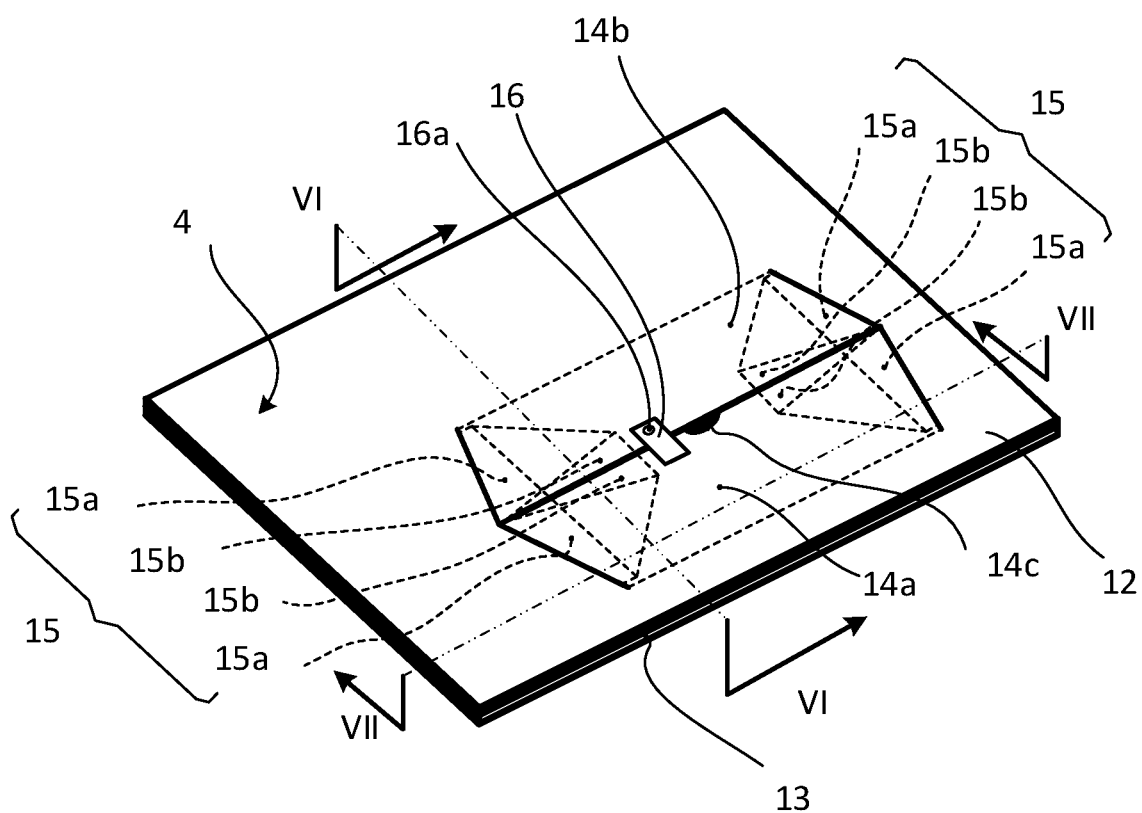
FIG. 3 is an enlarged perspective view that shows the foldable holding device in the folded state.
Figure 10:
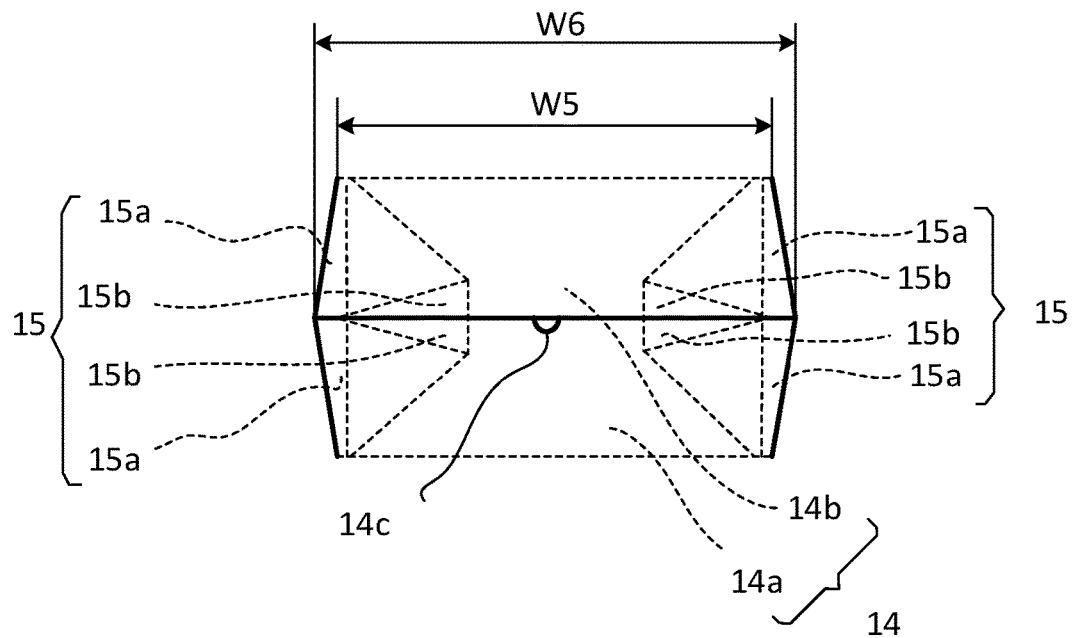
FIG. 10 is an enlarged plane view that shows the foldable holding device in the folded state.

The floorboard 4 has the holding device 10 which can be folded into the housing member (recess) 13. Specifically, as shown in FIGS. 1, 3, and 10, the housing member (recess) 13 is normally covered by a top panel (top panels 14a and 14b) 14 that can be raised and has the shape of a substantially hexagonal shape panel in a plan view. In the present embodiment, the top panels 14 are respectively movably supported centering on a pair of facing edges (corresponding to a front edge and a rear edge of the housing member (recess) 13) and are configured with a first top panel 14a and a second top panel 14b that can be raised. Each of the first top panel 14a and the second top panel 14b has, for example, a rigid core and a main surface side of this rigid core material is covered by the carpet material 12. Further, the flat top panel 14 is formed when the holding device 10 is in the folded state. Because the surface of the top panel 14 is covered with the carpet material 12 that is the same as the surrounding area's carpet, it presents an attractive appearance. Further, as long as being a flexible raw material, the carpet material 12 can also be other flexible fabric components (fabric sheets) without being limited to the carpet material. Further, on an upper edge of the first top panel 14a, for example, a finger-hold point 14c, cut out in an arc-like shape, is provided to enable a finger to be inserted.

A pair of side panels 15 is foldably connected to both ends of the first top panel 14a and the second top panel 14b. The pair of side panels 15 is formed, for example, of a rigid material that is the same as the top panels 14, and for instance, is integrally connected to the top panels 14 by flexible hinges 20. The flexible hinges 20 are made by thinning the rigid material so that the flexible hinges 20 can be living hinges. The flexible hinges 20 may also connect between lower edges of the first top panel 14a and the second top panel 14b and the adjacent core materials 11 of the floorboard body 5. Although an illustration is omitted from the drawings, when the pair of side panels 15 are also covered by the carpet material 12, the hinges 20 can also be covered by the carpet material 12 or cannot be covered by the carpet material 12.

Each of the pair of side panels 15 has a pair of first triangular side panels 15a and a pair of second triangular side panels 15b. The pair of first triangular side panels 15a are generally triangular or trapezoidally shaped. Specifically, edges of the first triangular side panels 15a are respectively and foldably connected to side edges of the first top panel 14a and the second top panel 14b (may be via hinges 20 (living hinges)). The tip of the first triangular side panel 15a can be sharp, or it can also be a trapezoidal shape in which a tip corner is cut off as shown in the drawings. The pair of second triangular side panels 15b are foldably connected to each sloped edge of the pair of first triangular side panels 15a. The second triangular side panel 15b is, for example, has a triangle shape in which a tip corner is cut off (trapezoidal shape) as shown in the drawings, or the tip can also be sharp without cutting off the tip corner. A lower edge of the second triangular side panel 15b corresponds to a lower edge of the side panel 15 in the raised state. Further, the edges that are continuous with each other are foldably connected. As mentioned above, the first and second triangular side panels 15a and 15b are generally triangularly or trapezoidally shaped (referred to as triangular shape). The same configuration is applied to all side panels in the embodiments of this application.

Figure 12A:
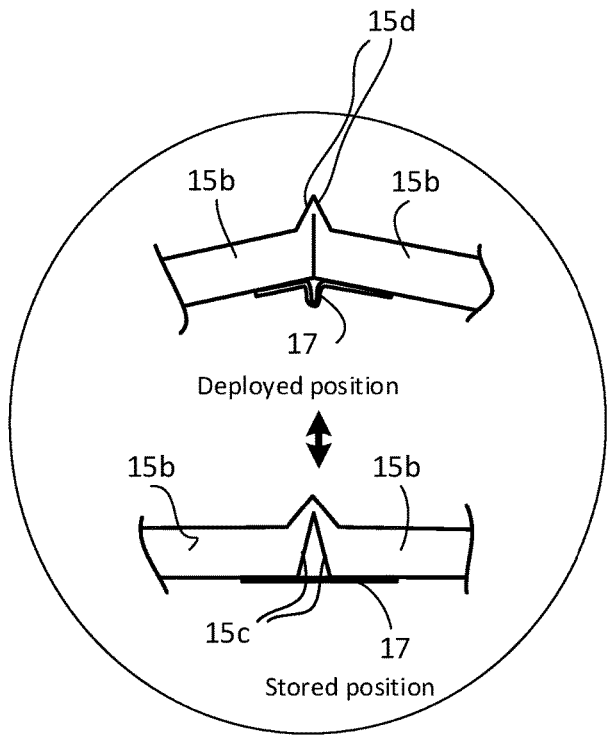
FIG. 12A is an enlarged view that shows a XIIA part shown in FIG. 5.

As shown in FIG. 12A, connection ends 15c to which the pair of second triangular side panels 15b are mutually connected are connected by a connection fabric material (connection fabric sheet or connection cloth (sheet)) 17. Specifically, the surfaces adjacent to the connection ends 15c of the pair of second triangular side panels 15b on the side of the housing member (recess) 13 by the connection fabric material 17 that is flexible so as to span over the pair of second triangular side panels 15b. The connection fabric material 17 can prevent the pair of second triangular side panels 15b in the folded state from being separated. In the folded state, the connection fabric material 17 is in an extended manner. In FIG. 12A, with respect to the connection ends 15c, a projection 15d that has a triangle shape is formed on the opposite side of the housing member (recess) 13. The projections 15d can limit the opening of the pair of second triangular side panels 15b in the folded state so as not to further open. Further, the projections 15d are connected by the living hinge. In the raised state, the connection fabric material 17 is bent.

Figure 12C:
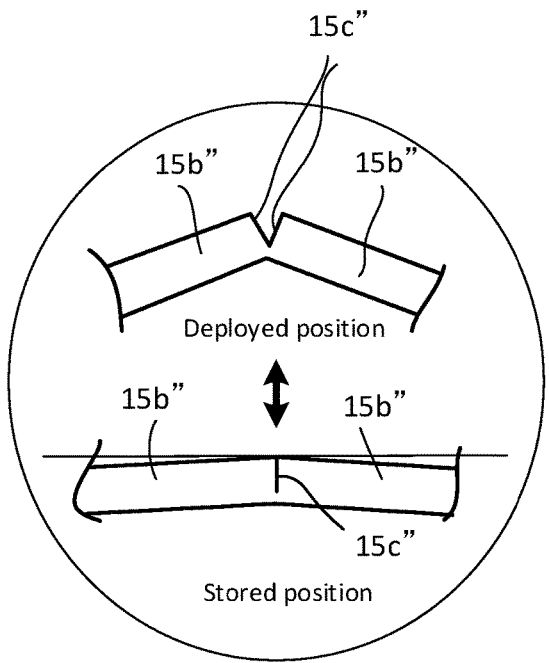
FIG. 12C is a perspective view corresponding to FIG. 12A according to a third variation of the first embodiment of the present invention.
Figure 12B:
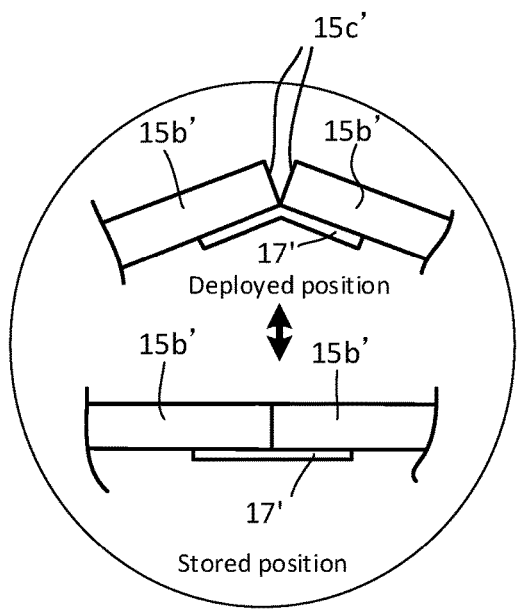
FIG. 12B is a perspective view corresponding to FIG. 12A according to a second variation of the first embodiment of the present invention.

As shown in FIG. 12B, in a second variation according to the first embodiment of the present invention, the above-mentioned projections 15d are not provided. Instead, a connection plate member 17' that is in a rectangular shape is integrally formed at a hinge part of the two side panels. In the raised state, connection ends 15c' of a pair of second triangular side panels 15b' are separated each other at the opposite side of the housing member (recess) 13. At this time, the connection ends 15c' can be configured so as to be in a spread state in a V-shape. The connection plate member 17' may be configured by a shape-memory member in which the connection plate member 17' maintains a V-shape bent configuration in the raised state and is stable with such shape.

As shown in FIG. 12C, in a third variation according to the first embodiment of the present invention, a pair of second triangular side panels 15b" are mutually connected at connection ends 15c' by a thin part thereof on a surface facing the housing member (recess) 13. That is, the pair of second triangular side panels 15b" are mutually connected by a living hinge at the connection ends 15c". In the raised state, the connection ends 15c" can be configured so as to be in a spread state in a V-shape. The connection ends 15c" and/or the living hinge of the pair of second triangular side panels 15b" may be configured by a shape-memory member in which they maintain the V-shape configuration in the raised state and are stable with such shape. Further, in the folded state, because the pair of connection ends 15c" are abutted, it is possible to bear against the load from above.

Figure 12D:
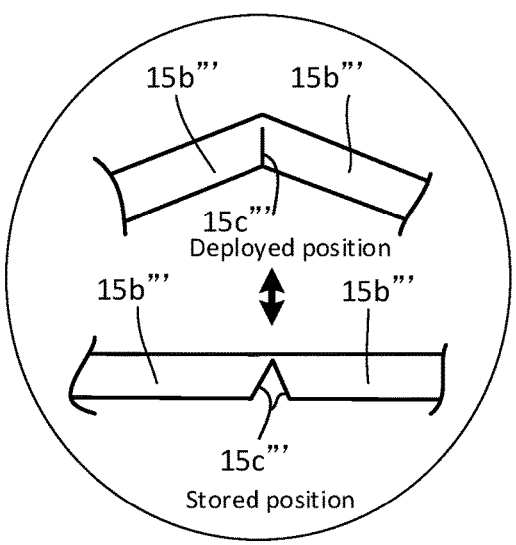
FIG. 12D is a perspective view corresponding to FIG. 12A according to a fourth variation of the first embodiment of the present invention.

As shown in FIG. 12D, in a fourth variation according to the first embodiment of the present invention, a pair of second triangular side panels 15b''' are mutually connected at connection ends 15c''' by a thin part thereof on the opposite surface of the housing member (recess) 13. That is, the pair of second triangular side panels 15b''' are mutually connected by a living hinge at the connection ends 15c'''. In this case, it is also possible that an opening degree of the pair of second triangular side panels 15b''' in the raised state is limited because the pair of connection ends 15c''' are abutted. At the same time, the connection ends 15c''' and/or the living hinge of the pair of second triangular side panels 15b''' may be configured by a shape-memory member in which they maintain the V-shape configuration in the raised state and are stable with such shape.

As shown in, for example, FIG. 3, a locking part 16 that is in a rectangular shape, for instance, is provided at the first top panel 14a and is projected (extended) from the first top panel 14a. In addition, a locked part 16a to which the locking part 16 locks is provided at the second top panel 14b. A locking structure between the locking part 16 and the locked part 16a is not particularly limited. However, for instance, the structures are adopted by using such as a button structure and a hook and loop fastener so as to make the lock state and to release the lock state in a single operation.

Figure 13A:
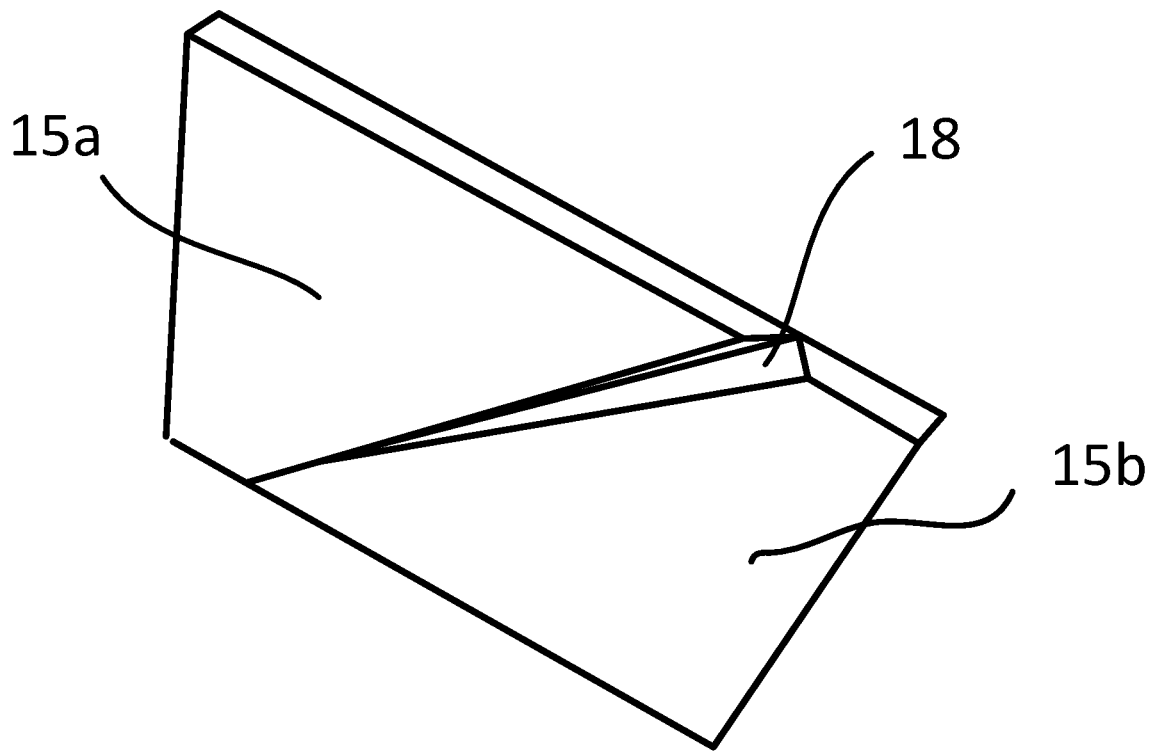
FIG. 13A is an enlarged perspective view that shows a XIIIA part shown in FIG. 5.

Meanwhile, in an enlarged perspective view as shown in FIG. 13A, at mating faces (the hinge) between the first triangular side panel 15a and the second triangular side panel 15b explained above, a chamfer 18 for preventing a finger from pinching is provided. The chamfer 18 can be provided at at least an upper part in which a finger can reach at the mating faces between the first triangular side panel 15a and the second triangular side panel 15b. As a result, the finger pinch during a standing (raising) position operation can be effectively prevented. On the other hand, because the chamfer 18 is not provided at a lower end side of the mating faces, a raised state of the side panel 15 can be maintained. The part in which the chamfer 18 is not provided can also be located at middle parts of the mating faces. The chamfer 18 is formed by being cut off on the side facing the housing member (recess) 13 so as to be a thinner or smaller cut off part (chamfer) at a side closer to the lower end side of the mating faces. Such thinner or smaller cut off part becomes gradually wider toward a part that is an upper side when the side panel 15 is raised. In other words, a chamfered amount of the chamfer is getting larger from the lower edges toward the upper edges of adjacent two of the plurality of side panels 15.

Figure 13B:
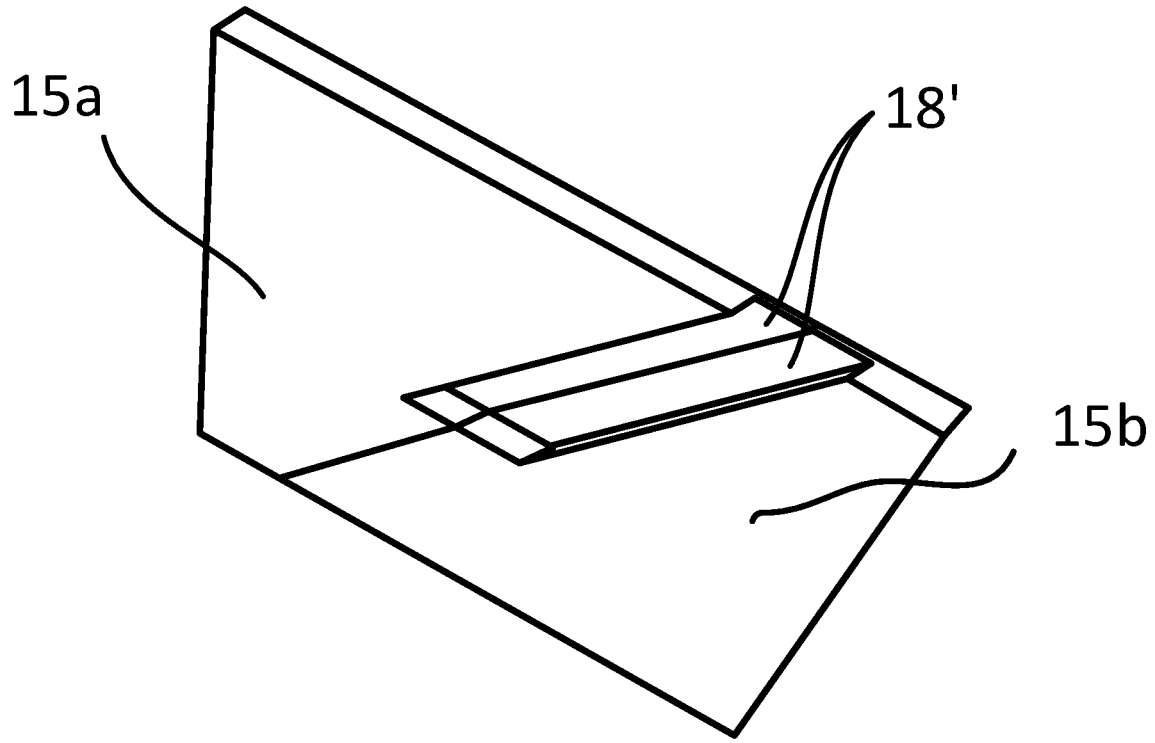
FIG. 13B is a perspective view corresponding to FIG. 13A according to a fifth variation of the first embodiment of the present invention.

On the other hand, as shown in FIG. 13B, a chamfer 18' for preventing a finger pinch can also be formed with grooves having almost the same widths from an intermediate portion in the height direction toward an upper edge side of the side panel 15 in the raised state. Further, in this case, the finger pinch during the standing (raising) position operation can also be effectively prevented.

Figure 5:
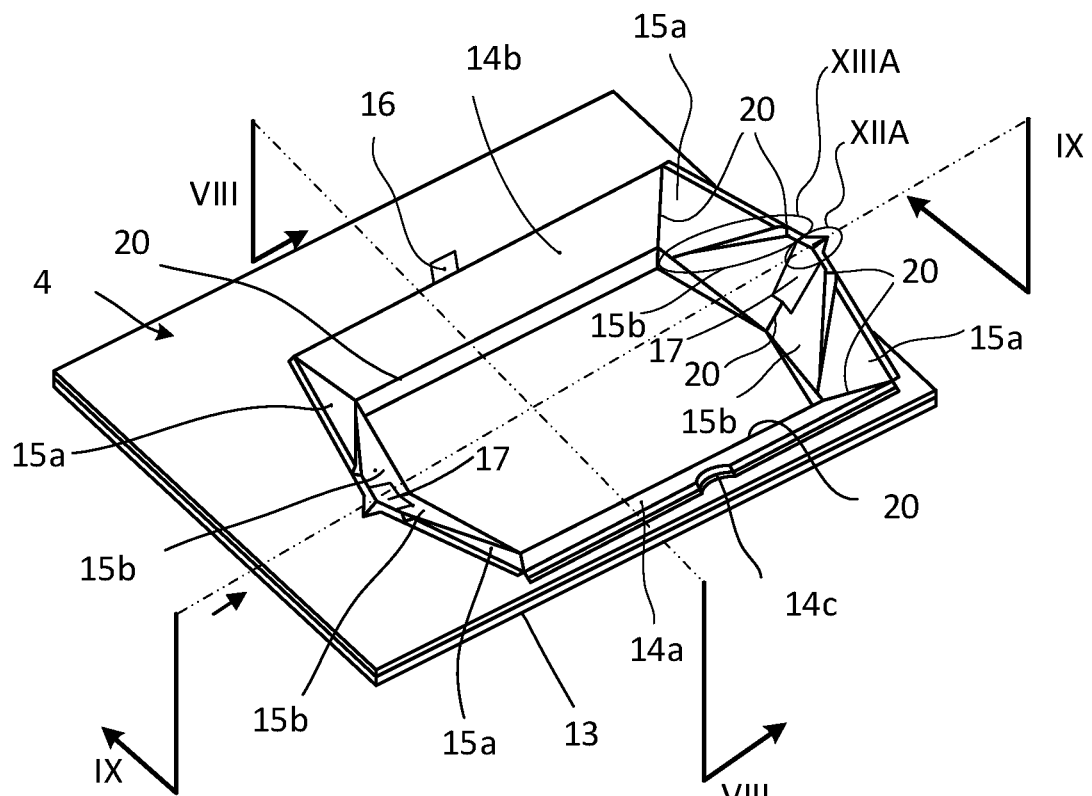
FIG. 5 is an enlarged perspective view that shows the foldable holding device in the raised state.
Figure 8:
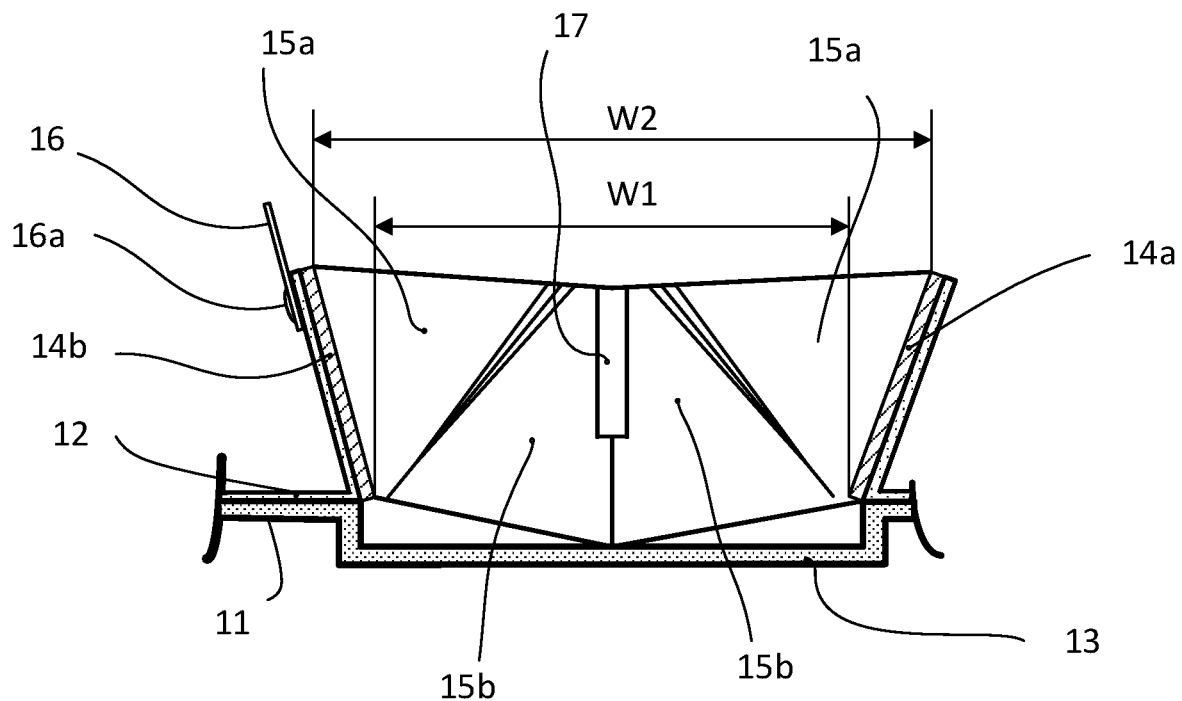
FIG. 8 is a cross section view that shows the foldable holding device in the raised state along the VIII-VIII line shown in FIG. 5.
Figure 9:
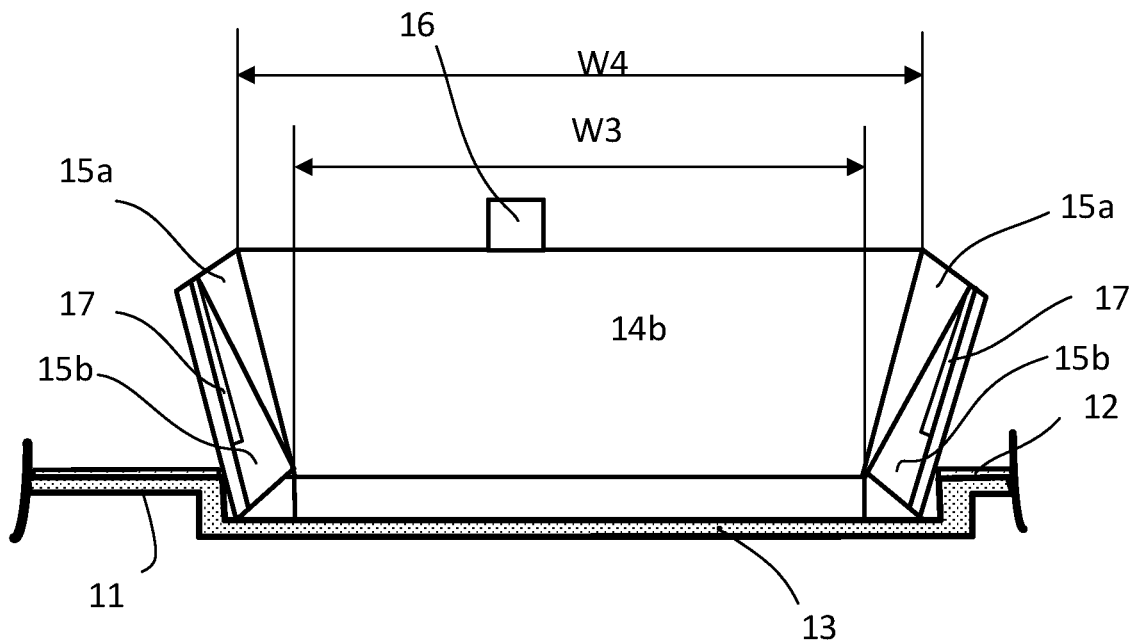
FIG. 9 is a cross section view that shows the foldable holding device in the raise state along the IX-IX line shown in FIG. 5.

When the first top panel 14a and the second top panel 14b are raised, the pair of side panels 15 is also raised at positions mutually opposed to each other so as to form the holding device 10 that is in the substantially hexagonal shape in the plan view together with the top panels 14. Specifically, as shown in FIG. 8, a width W2 of the upper edge is longer than a width W1 of the lower edge of the pair of side panels 15 in the raised state (W2>W1). Further, as shown in FIG. 9, a width W4 of the upper edge is longer than a width W3 of the lower edge of the first top panel 14a and the second top panel 14b in the raised state (W4>W3). As a result, the holding device 10 has the container shape in which the upper edge side is made wider in the raised state. In other words, the pair of top panels 14 and the pair of side panels 15 are outwardly inclined in the raised state in the plan view. Further, as shown in FIGS. 5, 8, and 9, part of a lower edge of one of the pair of side panels 15b is located at an outer side of a line connecting ends of the lower edges of the raisable pair of top panels 14a and 14b with respect to the housing member (recess) 13 in the plan view in the open state. The lower edge of the one of the pair of side panels 15b is configured with two line segments and the two line segments extend in different directions. The part of the lower edge of one of the pair of side panels 15b abuts the housing member (recess) 13 in the open state.

Further, as shown in FIG. 10, a width W6 (corresponding to W4 shown in FIG. 9) of the upper edge (the free end) side is longer than a width W5 (corresponding to W3 shown in FIG. 9) of the lower edge (the hinge) side of the first top panel 14a and the second top panel 14b in the folded state (W6>W5) in the plan view. As a result, the top panels 14 are in a hexagonal shape in the folded state in the plan view.

Figure 11:
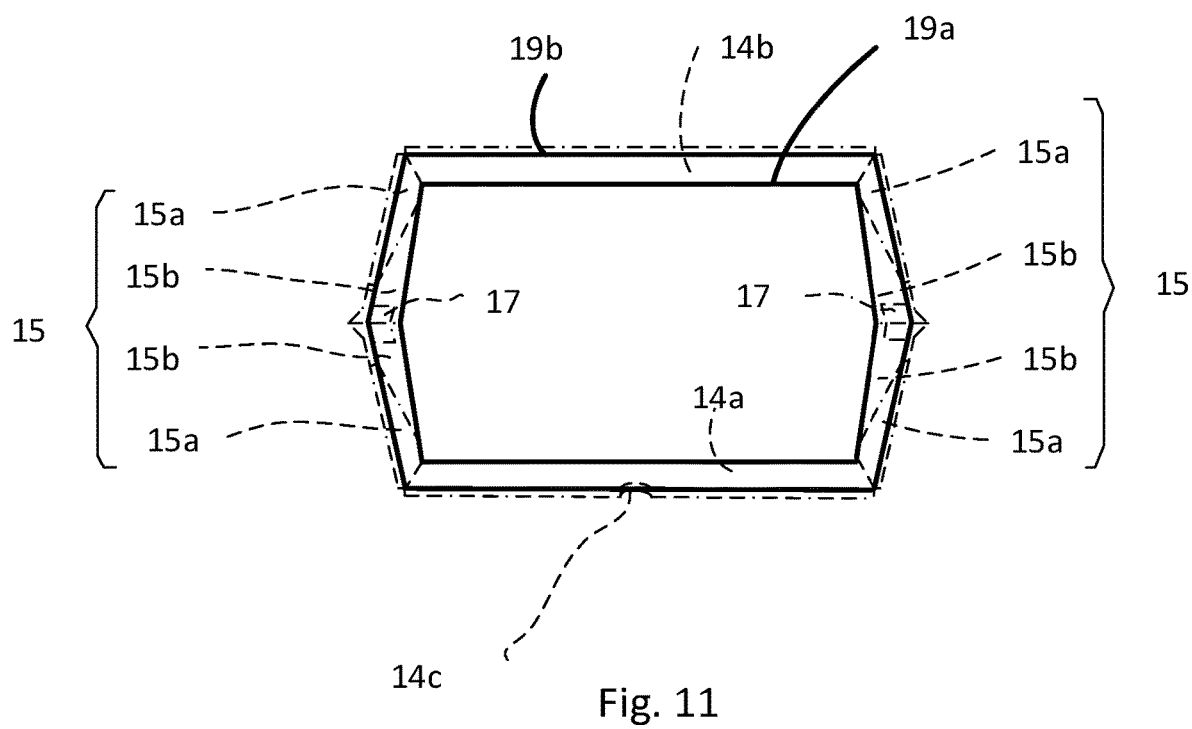
FIG. 11 is an enlarged plane view that shows the foldable holding device in the raised state.

Further, as shown in FIG. 11, in the raises state, an inner periphery 19a that is formed by the lower edges of the top panels 14 and the lower edges of the side panels 15 is in a hexagonal shape (is a hexagon). Further, an inner periphery 19b that is formed by the upper edges of the top panels 14 and the upper edges of the side panels 15 is also in a hexagonal shape (a hexagon). In other words, as shown in FIGS. 2, 5, 8, 9, 11, and 14, a top periphery of the foldable holding device 10 in the raised state (open state) formed by the upper edges of the pair of top panels 14 and the upper edges of the pair of side panels 15 is a hexagon in the plan view. In similarly, a lower periphery of the foldable holding device 10 in the open state formed by the lower edges of the pair of top panels 14 and the lower edges of the pair of side panels 15 is a hexagon in the plan view. Further, the pair of top panels 14 and the pair of side panels 15 are outwardly inclined in the open state in the plan view. Note that "hexagon" means that it may not be necessary to form a perfect shape of the hexagon by providing six vertices and sides. For example, it may be fine if such top periphery or lower periphery is in a substantially hexagon by not continuously connected by one line (including a discontinuous part).

Further, as shown in FIG. 8, the first top panel 14a and the second top panel 14b are foldably supported at a peripheral edge of the housing member (recess) 13 via the carpet material 12 (or it can be supported by other method).

Next, the use procedure for the floorboard 4 having the foldable holding device 10 according to the present embodiment will be explained.

Figure 7:
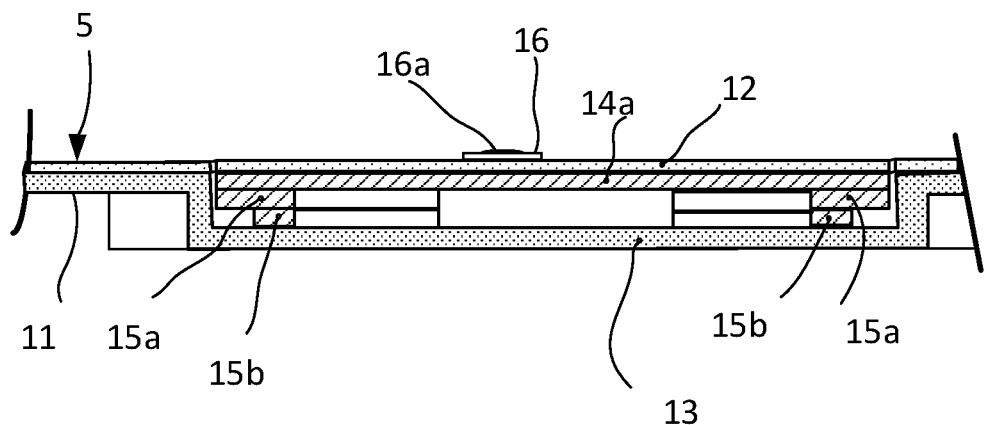
FIG. 7 is a cross section view that shows the foldable holding device in the folded state along the VII-VII line shown in FIG. 3.

In the folded state (housed state) shown in FIGS. 1 and 3, the pair of side panels 15 is positioned under the top panels (14a and 14b) as shown in FIGS. 6 and 7, and is held down by the weight of the top panels 14. Thus, the top and side panels 14 and 15 overlap substantially in parallel so that a flat state is maintained. The surfaces of the top panels 14 are covered with the carpet material 12. Because the surfaces of the top panels 14 are approximately at the same height as their surrounding surfaces, it presents an attractive appearance. In addition, when the luggage or goods are loaded or unloaded in the compartment 1, the luggage or goods is difficult to be caught because the entirety of the tip surfaces are smooth. Further, because the thickness of the floorboard 4 can be kept as thin as possible, it is benefit for vehicle designs.

Figure 4:
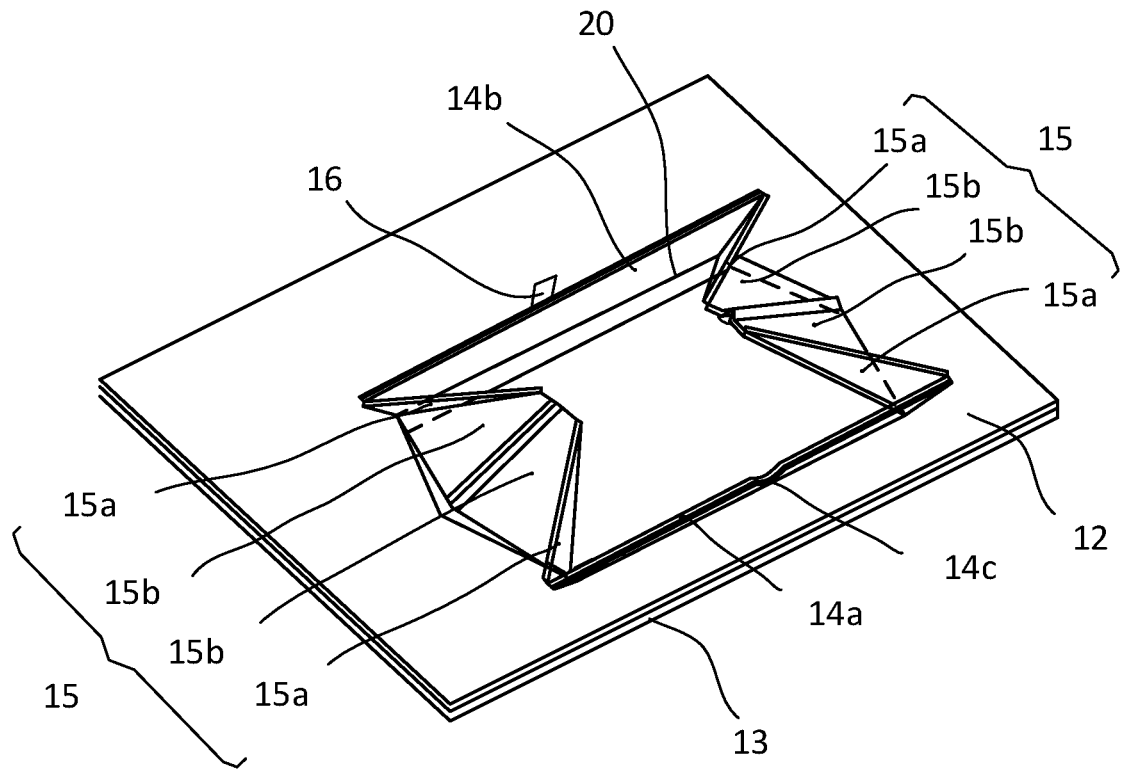
FIG. 4 is an enlarged perspective view that shows the foldable holding device while being raised (a half-raised state).

Next, when the first top panel 14a is raised as shown in FIG. 4, a finger is applied to the finger-hold point 14c and the first top panel 14a is upwardly pulled. By doing the above, the first triangular side panels 15a that are connected to the first top panel 14a (and the second triangular side panels 15b) are also pulled up. As a result, the second top panel 14b on the opposite side is also gradually raised. It is possible that the second top panel 14b on the opposite side is also completely raised only by pulling up the first top panel 14a.

As explained above, upon opening the holding device 10 by pulling up the first top panel 14a, the pair of side panels 15 (15a and 15b) that are connected to the first top panel 14a and the second top panel 14b are also opened (raised) and work together. As a result, the holding device 10 that is in a substantially hexagonal shape in the plan view is formed. Further, the container-shaped state can be easily maintained by the weight of the pair of side panels 15 and the top panels 14 themselves. Thus, when the luggage is stored, even when the luggage is moved therein, the pair of side panels 15 and the top panels 14 hardly fall down. Therefore, the holding device 10 readily becomes the container-shaped state, and at the same time, the container-shaped state is maintained.

Figure 24:
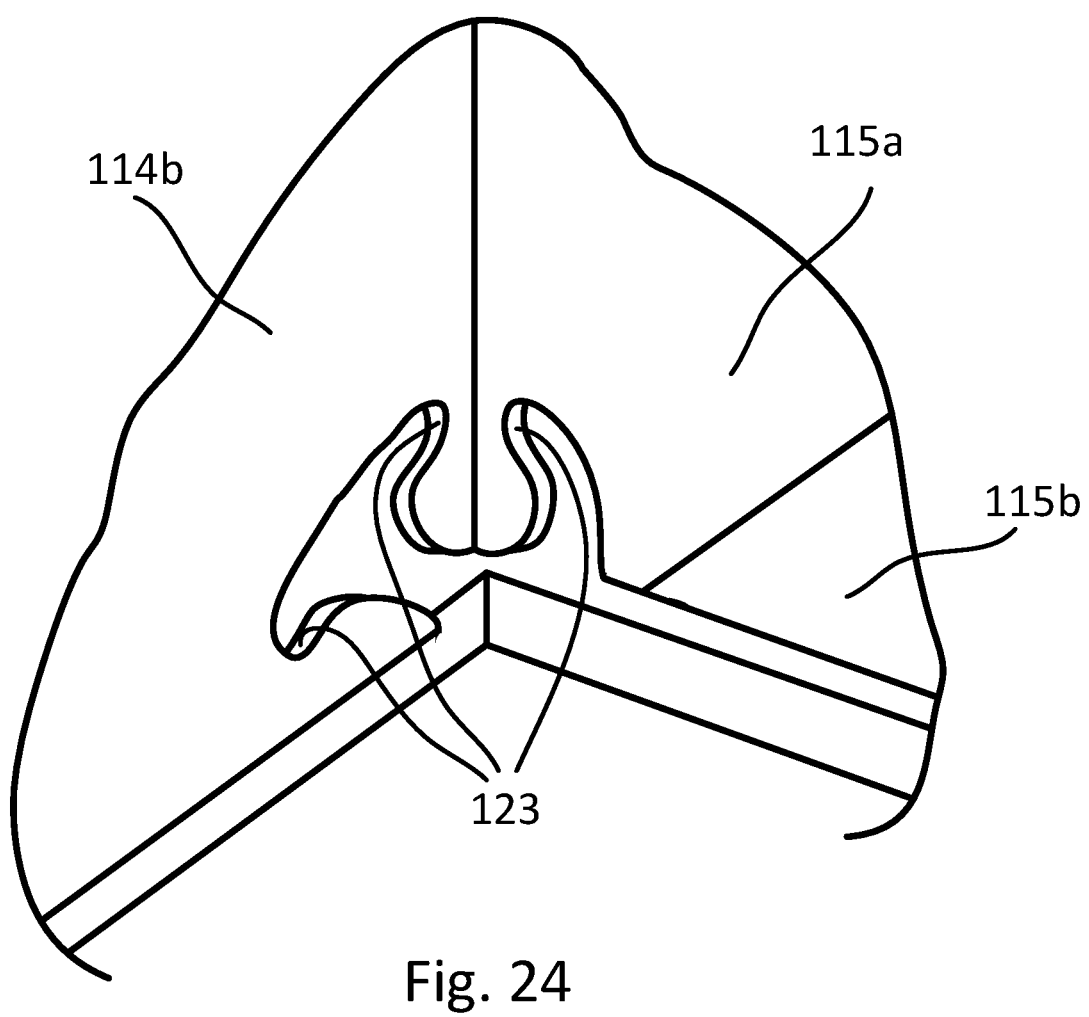
FIG. 24 is an enlarged view that shows a XXIV part shown in FIG. 19.

In reverse (closing/housing/folding), when the holding device 10 is folded (housed), it is preferred that the pair of side panels 15 are inwardly pushed at the same time. On the other hand, even when an unintended force is applied to only one of the side panels 15, it is difficult to be closed. The pair of side panels 15 are made with the rigid material, not the conventional flexible material. Therefore, even when a force is applied to them from the luggage or goods that are stored, it is difficult to close the holding device 10. In addition, even when the weight of such as the luggage or goods is applied from above, it is difficult to close the holding device 10 as compared with a case in which the flexible material is used. Further, as shown in FIG. 24, on the lower side of the connection part (the hinge part) between the top panels 14 (114a and 114b) and the first triangular side panels 15 (115a and 115b), notches 123 may be respectively formed in the top panels 14 and the first triangular side panels 15. Because the stress concentration that occurs during the operation for foldably opening and closing (housing) the holding device 10 can be avoided by the notches 123, the damage of the hinge part due to a long-term deterioration is suppressed.

Therefore, in regards to the floorboard 4 having the foldable holding device 10 according to the present embodiment, the holding device 10 can be readily raised to become the container-shaped state, and at the same time, the container-shaped state can also be certainly maintained.

In addition, the operation (opening and folding) is extremely simple, and it can be made so that it can be opened by one-step operation with one hand, and at the same time, the open state (raised state) can be maintained.

Second Embodiment

Each of FIGS. 15-24 and 26A-26B shows a foldable holding device (referred to as "holding device") 110 according to a second embodiment of the present invention. The second embodiment is different from the first embodiment discussed above.

Specifically, the holding device 110 of the second embodiment is attachable to and detachable from the floorboard 4. Further, in the present embodiment below, the redundant explanations with respect to the same components shown in FIGS. 1-14 are omitted, but the same reference numbers are used for labeling.

Figure 20:
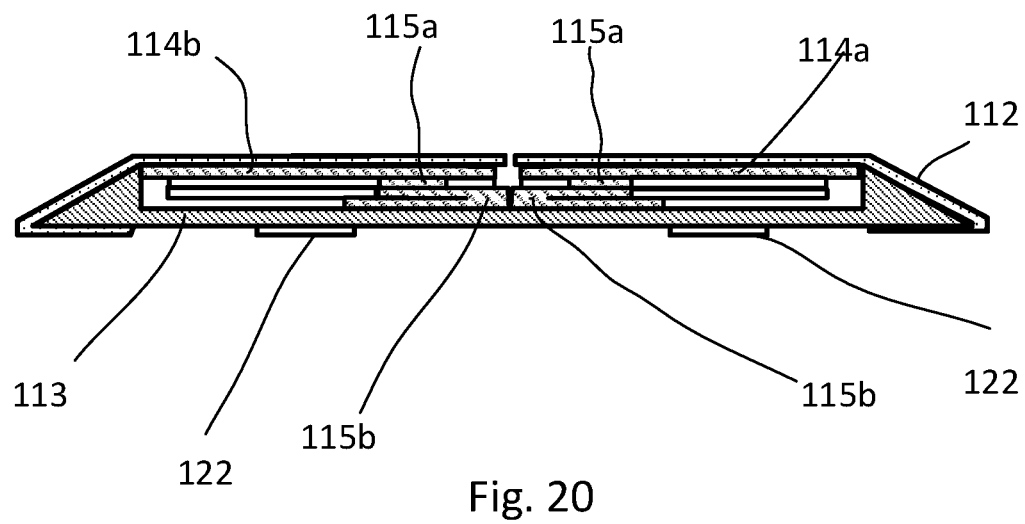
FIG. 20 is a cross section view that shows the foldable holding device in the folded state along the XX-XX line shown in FIG. 17A.
Figure 21:
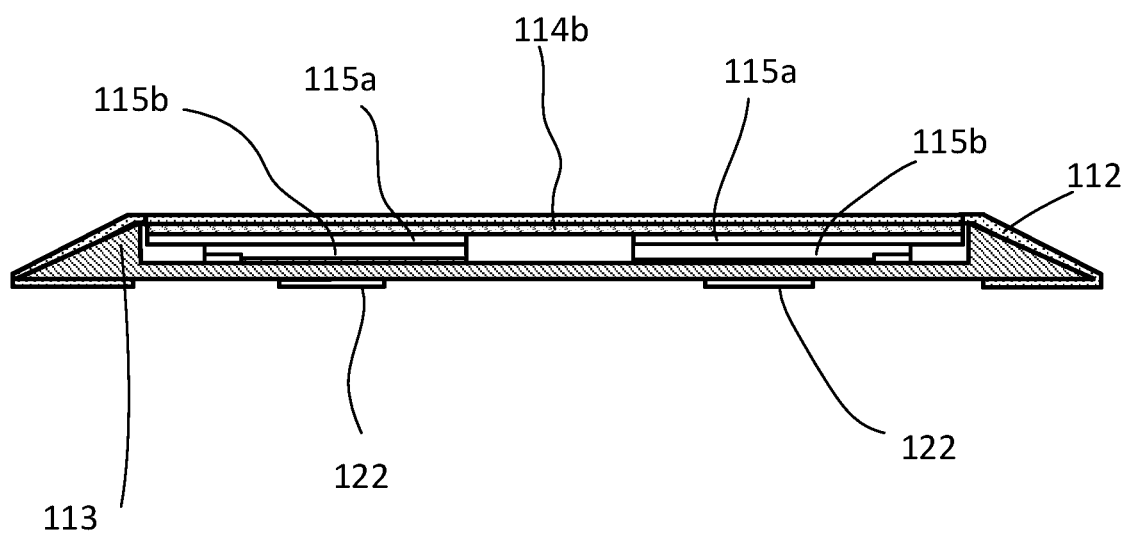
FIG. 21 is a cross section view that shows the foldable holding device in the folded state along the XXI-XXI line shown in FIG. 17A.

As shown in FIGS. 20 and 21, a holding device body (housing member 113 or body) that is configured with a core material 11 of the holding device 110 is configured to be attachable to and detachable from a carpet material 12 of a surface of the floorboard 4 by a touch fastener (hook and loop fastener) 122 that is provided on a bottom surface the holding device 110 (housing member 113 or body). For example, the hooks are provided on the bottom surface the holding device 110 and the loops are provided on the carpet material 12 of the surface of the floorboard 4. Alternatively, if the hooks are carefully designed in accordance with a property of the carpet material 12, the loops may not be provided on the carpet materials 12 because the hooks can be fixed with the carpet materials 12. In other words, because the holding device 110 as an aftermarket product can be attached in a luggage compartment 1 of such as vehicles, it is convenient.

In the same manner as the first embodiment explained above, a top panel 114 is configured with a pair of top panels 114a and 114b. Further, a side panel 115 is configured with a pair of first triangular side panels 115a and a pair of second triangular side panels 115b. The pair of top panels 114a and 114b is covered with a flexible fabric component (flexible fabric sheet or cloth (sheet)) 112. The fabric component 112 can be made by the same material as the carpet material 12 and can also be made by other materials. However, when the fabric component 112 has the same material and same color as the carpet material 12, it presents an attractive appearance.

Further, as shown in FIGS. 17A, 17B, 20, and 21, the entirety of the upper surface of the holding device 110 in the folded state is covered by the fabric component 112. Further, because the fabric component 112 continuously extends onto a bottom of the holding device 110 (the housing member 113). Specifically, because the fabric component 112 continuously extends onto a peripheral edge on the bottom, the entirety of the peripheral edge is covered by the fabric component 112 (see FIG. 17B).

Figure 22:
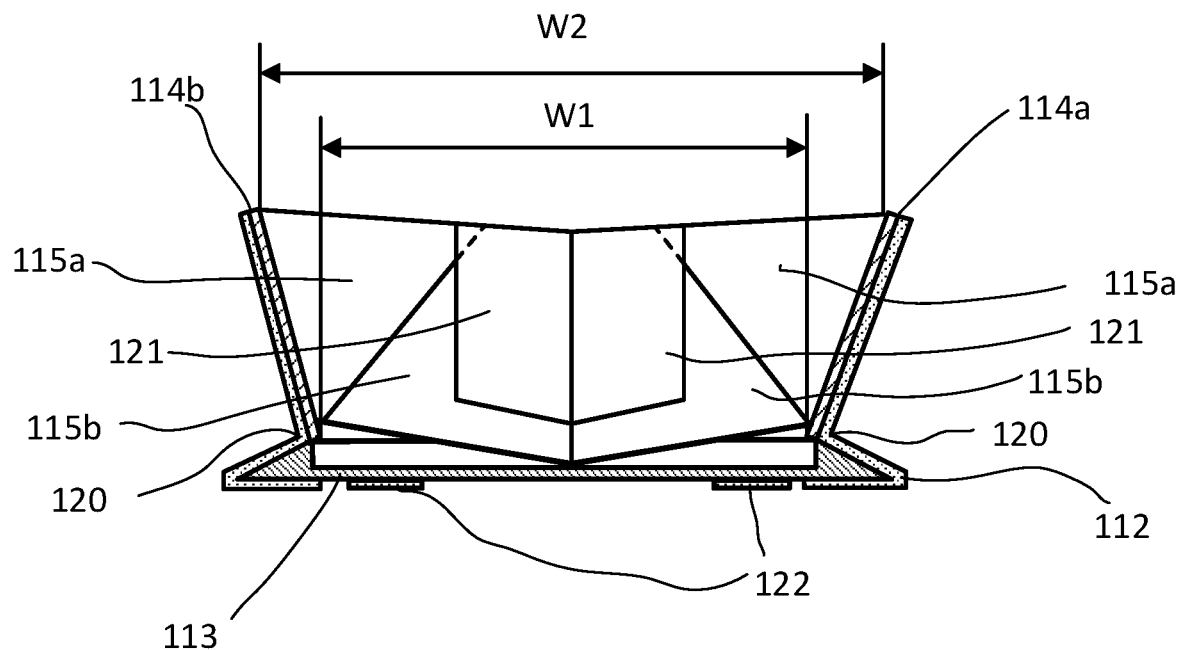
FIG. 22 is a cross section view that shows the foldable holding device in the raised state along the XXII-XXII line shown in FIG. 19.
Figure 23:
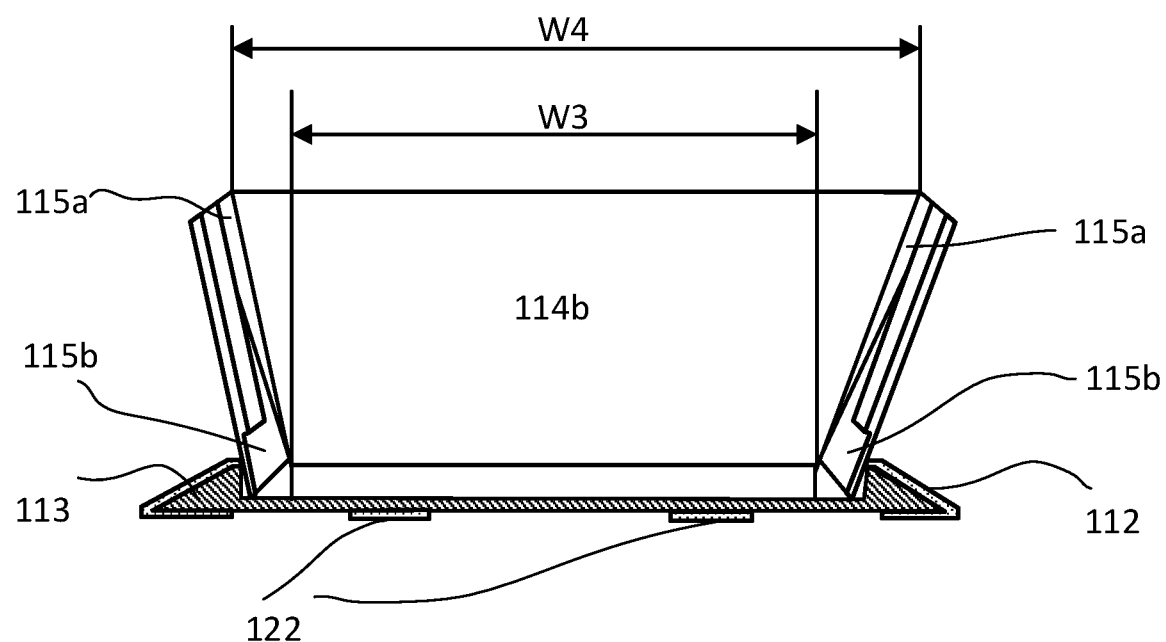
FIG. 23 is a cross section view that shows the foldable holding device in the raised state along the XXIII-XXIII line shown in FIG. 19.

As shown such as in FIGS. 21-23, in the present embodiment, two of the second triangular side panels 115b are not respectively connected to the housing member (recess) 113 by a hinge. The pair of top panels 114a and 114b are connected to the housing member (recess) 113 by the hinge. The hinge 120 can be hinge-connected to the core material 11 of the housing member (recess) 113 as a thin layer hinge. In other words, the thin layer hinge means a living hinge that is made of the core material 11. Alternatively, each of the top panels 14a and 14b and the housing member (recess) 113 can be connected by the fabric component 112 that works as the hinge.

Figure 19:
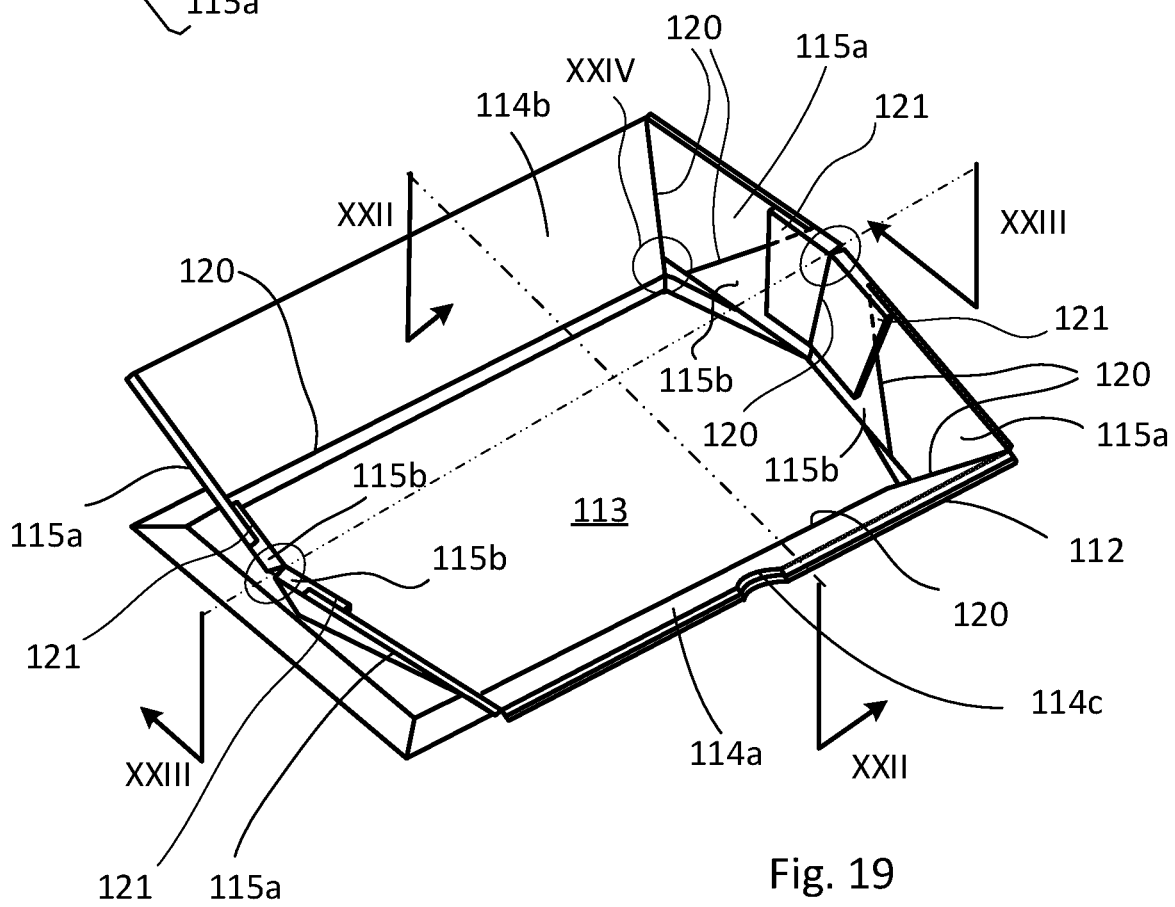
FIG. 19 is an enlarged perspective view that shows the foldable holding device in the raised state according to the second embodiment of the present invention.

In the present embodiment, as shown in FIG. 22, a width W2 of the upper edge is longer than a width W1 of the lower edge of the pair of side panels 115 in the raised state (W2>W1). Further, as shown in FIG. 23, a width W4 of the upper edge is longer than a width W3 of the lower edge of the first top panel 114a and the second top panel 114b in the raised state (W4>W3). Further, as the similar manner shown in FIG. 11 and as shown in FIGS. 16, 19, 22, and 23, in the present embodiment, an inner space of the holding device 110 in the container-shaped state (open state/raised state) that is formed with the top panels 114 and the side panels 115 (and the housing member (recess) 113) is in a hexagonal shape in the plan view. In other words, a top periphery of the foldable holding device 110 in the raised state (open state) formed by the upper edges of the pair of top panels 114 and the upper edges of the pair of side panels 115 is a hexagon in the plan view. Further, a lower periphery of the foldable holding device 110 in the open state formed by the lower edges of the pair of top panels 114 and the lower edges of the pair of side panels 115 is a hexagon in the plan view. Further, the pair of top panels 114 and the pair of side panels 115 are outwardly inclined in the open state in the plan view. Note that "hexagon" means that it may not be necessary to form a perfect shape of the hexagon by providing six vertices and sides. For example, it may be fine if such top periphery or lower periphery is in a substantially hexagon by not continuously connected by one line (including a discontinuous part). Further, as shown in FIGS. 19, 22, and 23, part of a lower edge of one of the pair of side panels 115b is located at an outer side of a line connecting ends of the lower edges of the raisable pair of top panels 114a and 114b with respect to the housing member (recess) 113 in the plan view in the open state. The lower edge of the one of the pair of side panels 115b is configured with two line segments and the two line segments extend in different directions. The part of the lower edge of one of the pair of side panels 115b abuts the housing member (recess) 113 in the open state.

In the present embodiment, extension parts 121 are formed at the connection edges of the pair of second triangular side panels 115b that are respectively connected to connection edges of the pair of first triangular side panels 115a. Specifically, the extension parts 121 extend over the connection edges of the pair of second triangular side panels 115b. For instance, each of the extension parts 121 is integrally formed with each of the pair of second triangular side panels 115b. Further, the side of each of the extension parts 121 facing the housing member (recess) 113 is formed so as to be thick than other part. Further, a surface of each of the extension parts 121 that is outwardly triangularly projected contacts the side of each of the first triangular side panels 115a. As a result, the extension parts 121 are configured so as to play roles as a stopper in order to prevent the side panels 115 from being further open.

Further, as shown in FIG. 24, on the lower side of the connection part (the hinge part) between the top panels 114a and 114b and the first triangular side panels 115a, notches 123 may be respectively formed in the top panels 114a and 114b and the first triangular side panels 115a. Because the stress concentration that occurs during the operation for foldably opening and closing (housing) the holding device 110 can be avoided by the notches 123, the damage of the hinge part due to a long-term deterioration is suppressed.

Figure 26A:
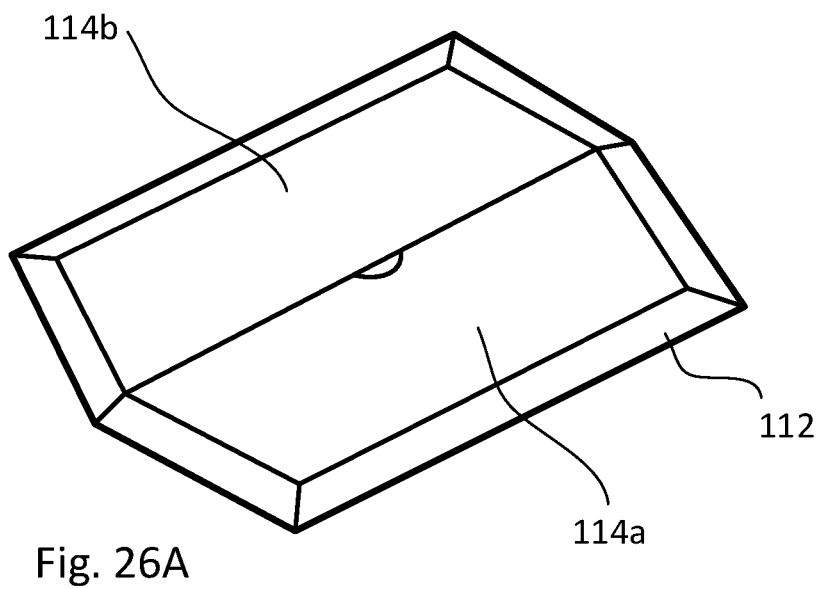
FIG. 26A is a perspective view that shows the foldable holding device in the folded state corresponding to FIG. 17A according to a variation of the second embodiment of the present invention.
Figure 26B:
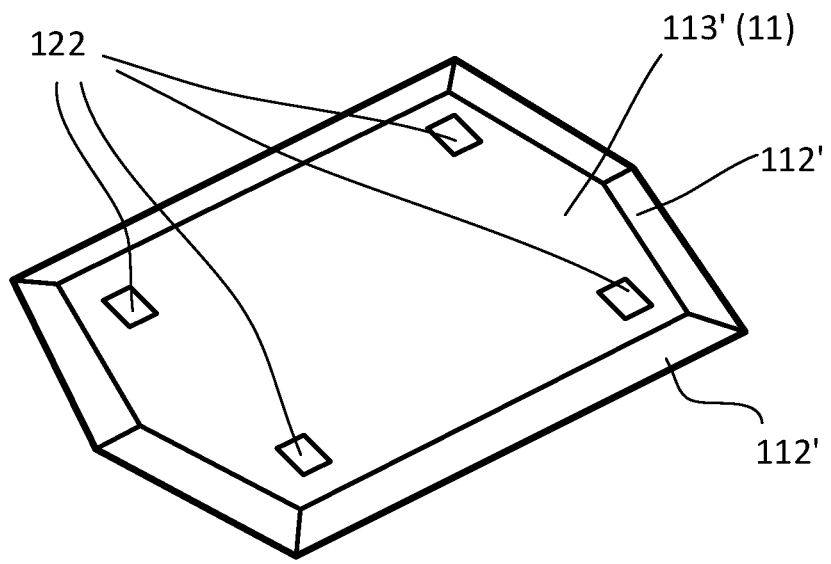
FIG. 26B is a perspective view that shows the foldable holding device in the folded state corresponding to FIG. 17B according to the variation of the second embodiment of the present invention when viewed from a bottom side.

Further, as a variation according to the present embodiment of the present invention, as shown in FIGS. 26A and 26B, a shape of the core material 11 of a housing member (recess) 113' can also be in a hexagonal shape. In this case, a fabric component (fabric sheet or cloth (sheet)) 112' can also be provided on the top panels 114a and 114b and continuously extends onto a bottom of the housing member (recess) 113'. Specifically, the fabric component 112' is provided along the peripheral edge having the hexagonal shape of the core material 11 (the housing member (recess) 113') on the bottom thereof.

Therefore, with respect to the foldable holding device 110 according to the present embodiment, the holding device 110 can be readily raised to become the container-shaped state. Further, at the same time, the container-shaped state can also be certainly maintained in the holding device 110. In addition, because the holding device 110 can be detachably attached to an arbitrary place on the floorboard 4 when needed, it is very convenient.

Third Embodiment

Figure 27A:
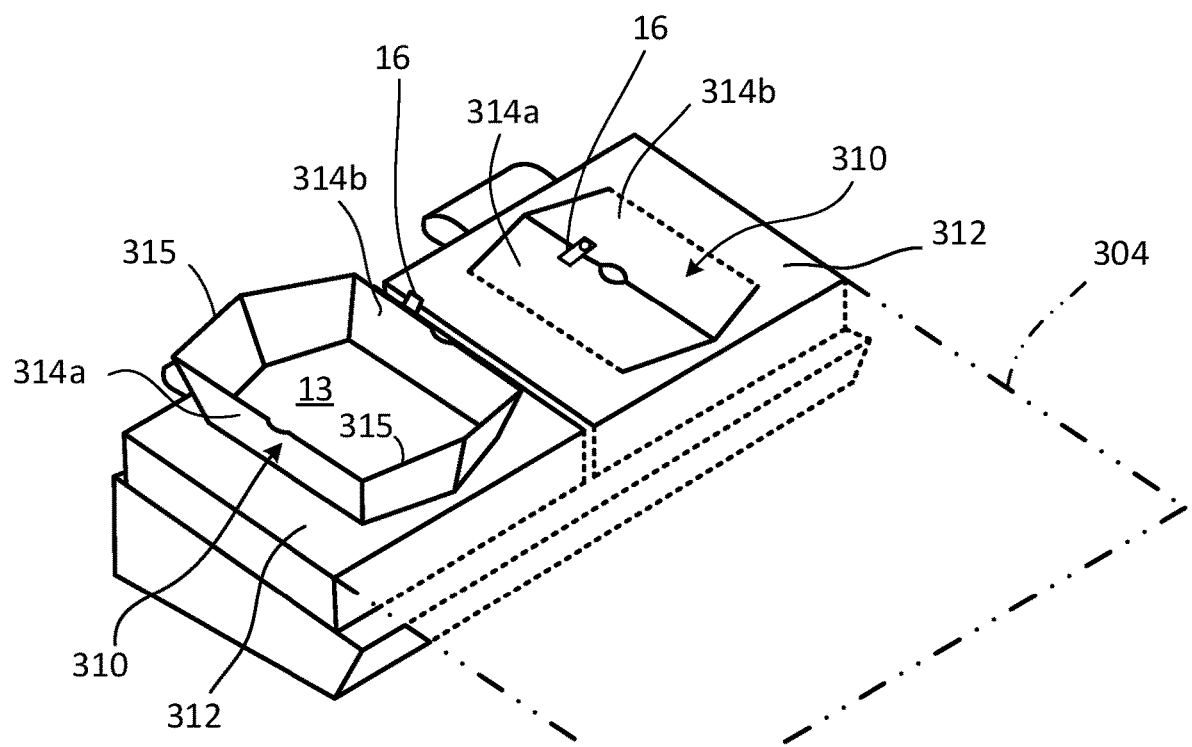
FIG. 27A is an enlarged perspective view that shows a foldable holding device in a folded state (housed state) according to a third embodiment of the present invention.
Figure 27B:
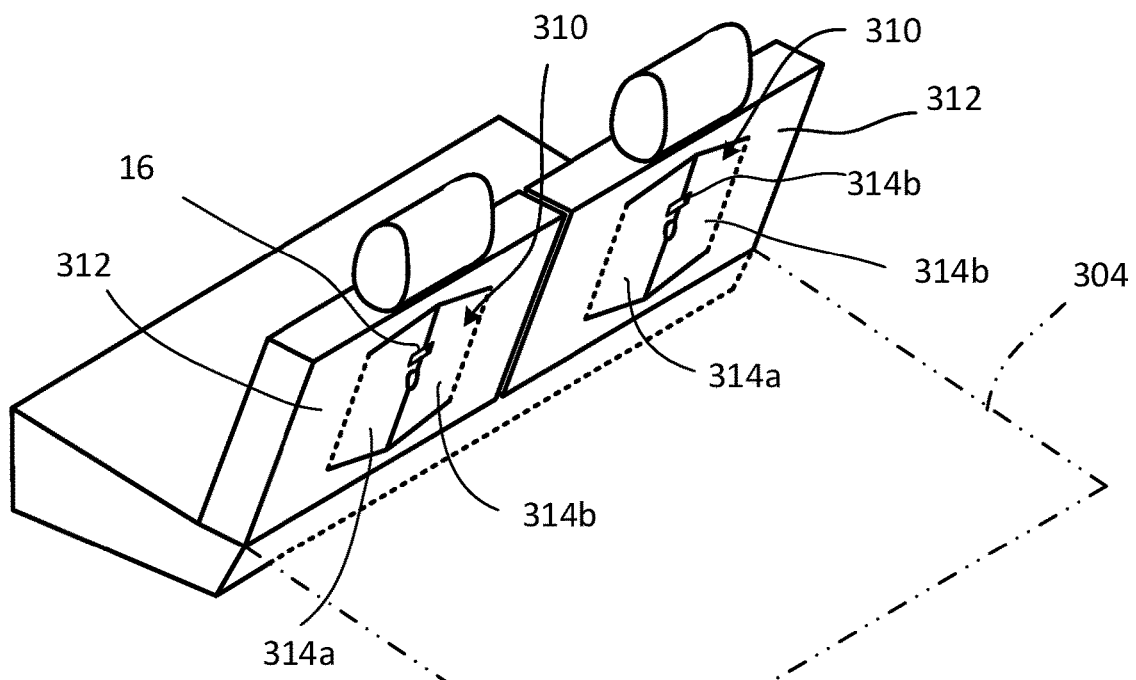
FIG. 27B is an enlarged perspective view that shows the foldable holding device in a raised state (open state) according to the third embodiment of the present invention.

Each of FIGS. 27A and 27B shows a holding device 310 according to a third embodiment of the present invention. The third embodiment is different from each of the first and second embodiments discussed above. Specifically, the holding device 310 is provided at a back side of a backrest 312 of a rear seat. Further, in the present embodiment, the redundant explanations with respect to the same components shown in FIGS. 1-24 and 26A-26B are omitted, but the same or similar reference numbers are used for labeling.

Specifically, in the present embodiment, as shown in FIG. 27A, the holding device 301 is provided at the back side of the backrest 312 of the rear seat that corresponds to the part of the floorboard 304 in the luggage compartment when the backrest 312 is forwardly tilted or reclined.

In the present invention, two of the holding devices 301 are provided in two of the backsides of the backrests 312. However, the holding device 301 can be provided in only either one of the backsides of the backrests 312. When two of the holding devices 301 are provided, it can be used according to the load of the luggage or goods by making either one of them raise or making both of them raise.

In a folded state (housed state) shown in FIG. 27B, the holding devices 301 are in the state of being embedded in the backsides of the backrests 312. Thus, the surfaces of the a first top panel 314a and a second top panel 314b that are closed have mostly the same heights as the other parts of the backrests 312. Because the locking part 16 locks the locked part 16a, the first top panel 314a and the second top panel 314b are not opened by mistake during the operation of an automobile. A locking structure between the locking part 16 and the locked part 16a is not particularly limited. However, for instance, the structures are adopted by using such as a button structure and a hook and loop fastener so as to make the lock state and to release the lock state in a single operation.

Also in the present embodiment, the holding device 310 has the substantially hexagonal shape in the plan view in the raised state. In other words, as shown in FIG. 27A, a top periphery of the foldable holding device 310 in the raised state (open state) formed by the upper edges of the pair of top panels 314 and the upper edges of the pair of side panels 315 is a hexagon in the plan view. In similarly, a lower periphery of the foldable holding device 310 in the open state formed by the lower edges of the pair of top panels 314 and the lower edges of the pair of side panels 315 is a hexagon in the plan view. Further, the pair of top panels 314 and the pair of side panels 315 are outwardly inclined in the open state in the plan view. Note that "hexagon" means that it may not be necessary to form a perfect shape of the hexagon by providing six vertices and sides. For example, it may be fine if such top periphery or lower periphery is in a substantially hexagon by not continuously connected by one line (including a discontinuous part). Further, as shown in FIG. 27A, part of a lower edge of one of the pair of side panels 315 is located at an outer side of a line connecting ends of the lower edges of the raisable pair of top panels 314a and 314b with respect to the housing member (recess) 13 in the plan view in the open state. The lower edge of the one of the pair of side panels 315 is configured with two line segments and the two line segments extend in different directions. The part of the lower edge of one of the pair of side panels 315 abuts the housing member (recess) 13 in the open state in the similar manner as shown in FIGS. 8 and 9.

Fourth Embodiment

Each of FIGS. 28A-28D shows a holding device 410 according to a fourth embodiment of the present invention. The fourth embodiment is different from the second embodiment discussed above. Specifically, one side panel 415 is different from the other side panel 115 in shape in the holding device 410. Further, in the present embodiment, the redundant explanations with respect to the same components shown in FIGS. 15-24 and 26A-26B are omitted, but the same or similar reference numbers are used for labeling.

Figure 28A:
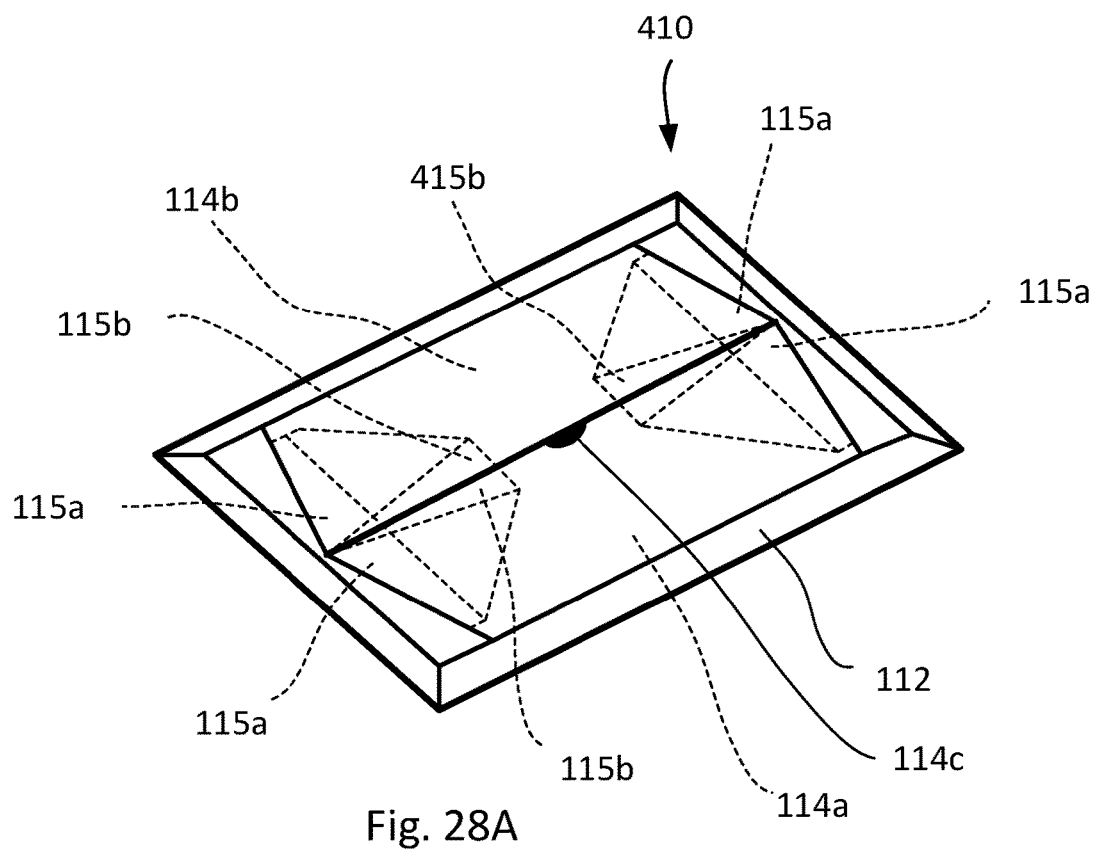
FIG. 28A is an enlarged perspective view that shows a foldable holding device in a folded state (housed state) according to a fourth embodiment of the present invention.

Specifically, in the present embodiment, as shown in FIG. 28A, the top panels 114 in the folded state is in a hexagonal shape in a plan view in the same manner as the second embodiment explained above.

Figure 28B:
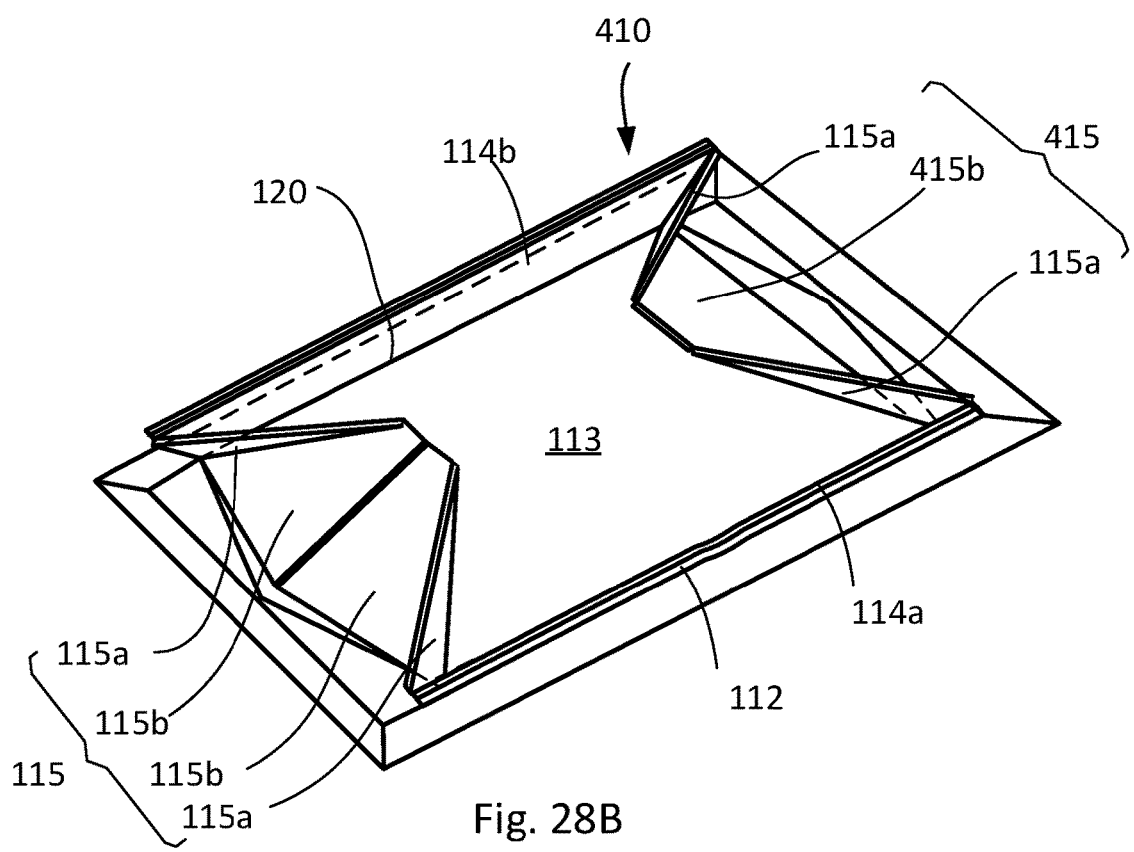
FIG. 28B is an enlarged perspective view that shows the foldable holding device in a half-raised state according to the fourth embodiment of the present invention.
Figure 28C:
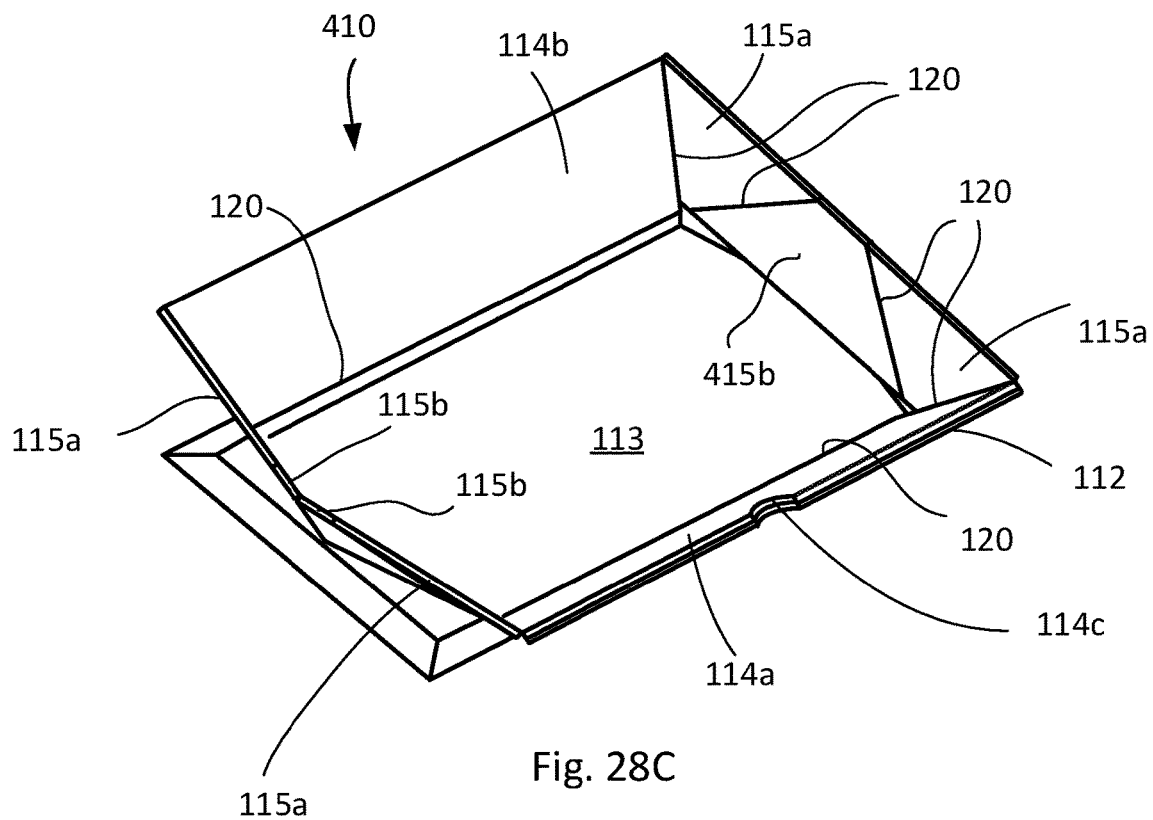
FIG. 28C is an enlarged perspective view that shows the foldable holding device in a raised state (open state) according to the fourth embodiment of the present invention.
Figure 28D:
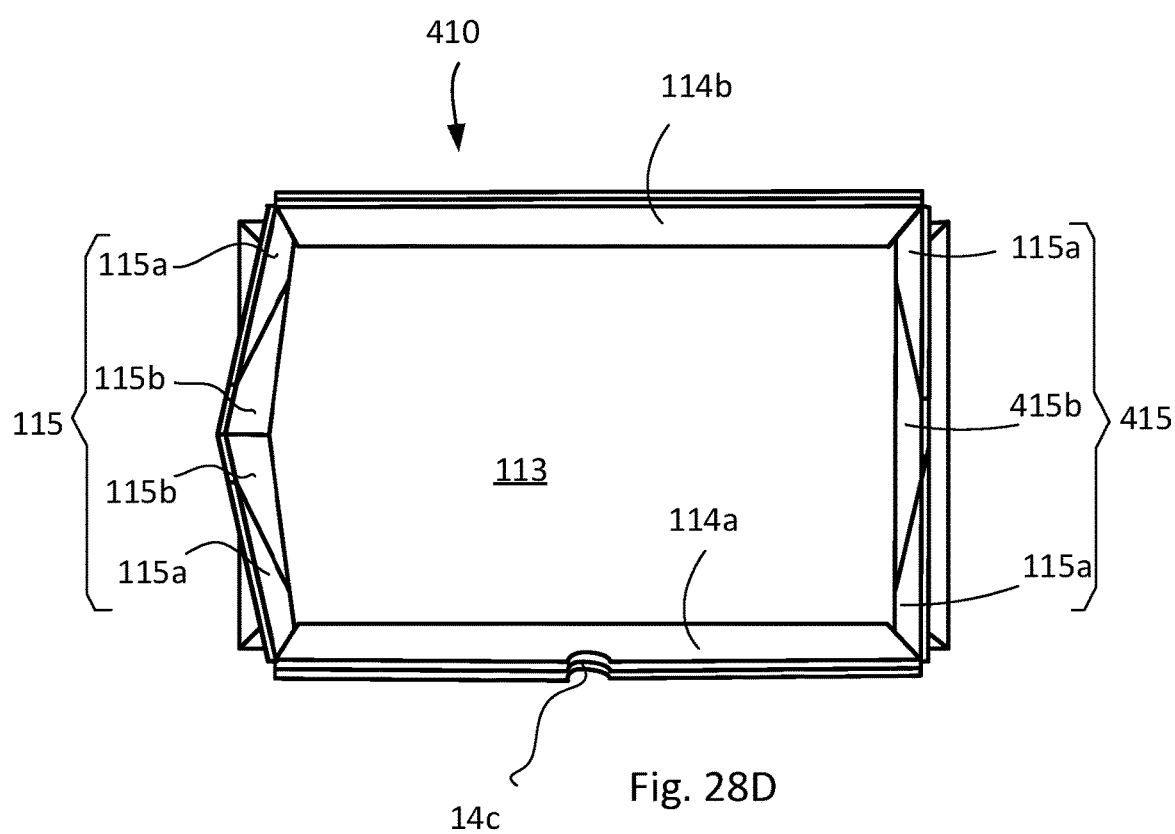
FIG. 28D is an enlarged plane view that shows the foldable holding device in the raised state according to the fourth embodiment of the present invention.

However, as shown FIGS. 28B, 28C, and 28D, one side panel 415 has the pair of first triangular side panels 115a in the same manner as the other side panel 115. But, in addition, the side panel 415 has only one second triangular side panel 415b. The other side panel 115 has the pair of second triangular side panels 115b in the same manner as the second embodiment.

As a result, in the present embodiment, in the raised state, as shown in FIG. 28D, the holding device 410 is in a substantially pentagon shape in the plan view. Specifically, the one side panel 415 has only one side and the other side panel 115 has three sides.

As explained in the present embodiment, it is possible that a pair of side panel 115 and side panel 415 do not have the same shapes/configurations and the number of the (second) triangular side panels is different. In the example shown in FIG. 28D, because the right side is straighten, it is efficient for a case in which the space on the right side is narrow or does not have an enough space.

Further, in the present embodiment, the holding device 410 is attachable to and detachable from the floorboard 4 in the same manner as the second embodiment explained above. However, the holding device 401 can also be integrally formed in the floorboard 4. In other words, the above one side panel 415 can be used in the first and third embodiments by replacing one of the side panels 115 or 315 is replaced with the above one side panel 415. Thus, as shown in FIG. 28D, a top periphery of the foldable holding device 410 in the raised state (open state) formed by the upper edges of the pair of top panels 114 and the upper edges of the pair of side panels 115 and 415 is a pentagon in the plan view. In similarly, a lower periphery of the foldable holding device 410 in the open state formed by the lower edges of the pair of top panels 114 and the lower edges of the pair of side panels 115 and 415 is a pentagon in the plan view. Further, the pair of top panels 114 and the side panel 415 are outwardly inclined in the open state in the plan view. Note that "pentagon" means that it may not be necessary to form a perfect shape of the pentagon by providing five vertices and sides. For example, it may be fine if such top periphery or lower periphery is in a substantially pentagon by not continuously connected by one line (including a discontinuous part). Further, as shown in FIGS. 28C and 28D, part of a lower edge of one of the pair of side panels 115 is located at an outer side of a line connecting ends of the lower edges of the raisable pair of top panels 114a and 114b with respect to the housing member (recess) 113 in the plan view in the open state. The lower edge of the side panel 115 is configured with two line segments and the two line segments extend in different directions. On the other hand, the lower edge of the side panel 415 is configured by one line segment. The part of the lower edge of one of the pair of side panels 115 abuts the housing member (recess) 113 in the open state in the similar manner as shown in FIGS. 22 and 23.

Thus, in the present embodiment, the configuration of one side panel is different from the configuration of the other side panel so that each of the top periphery and the lower periphery is a pentagon in the plan view. These configurations of the side panels can be applied to any of the embodiments and variations discussed above and below.

Fifth Embodiment

Each of FIGS. 29-37 shows a foldable holding device (holding device) according to a fifth embodiment of the present invention. Specifically, the fifth embodiment is directed to a method of assembling the holding device 110 shown in, for example, the second embodiment discussed above.

Figure 29:
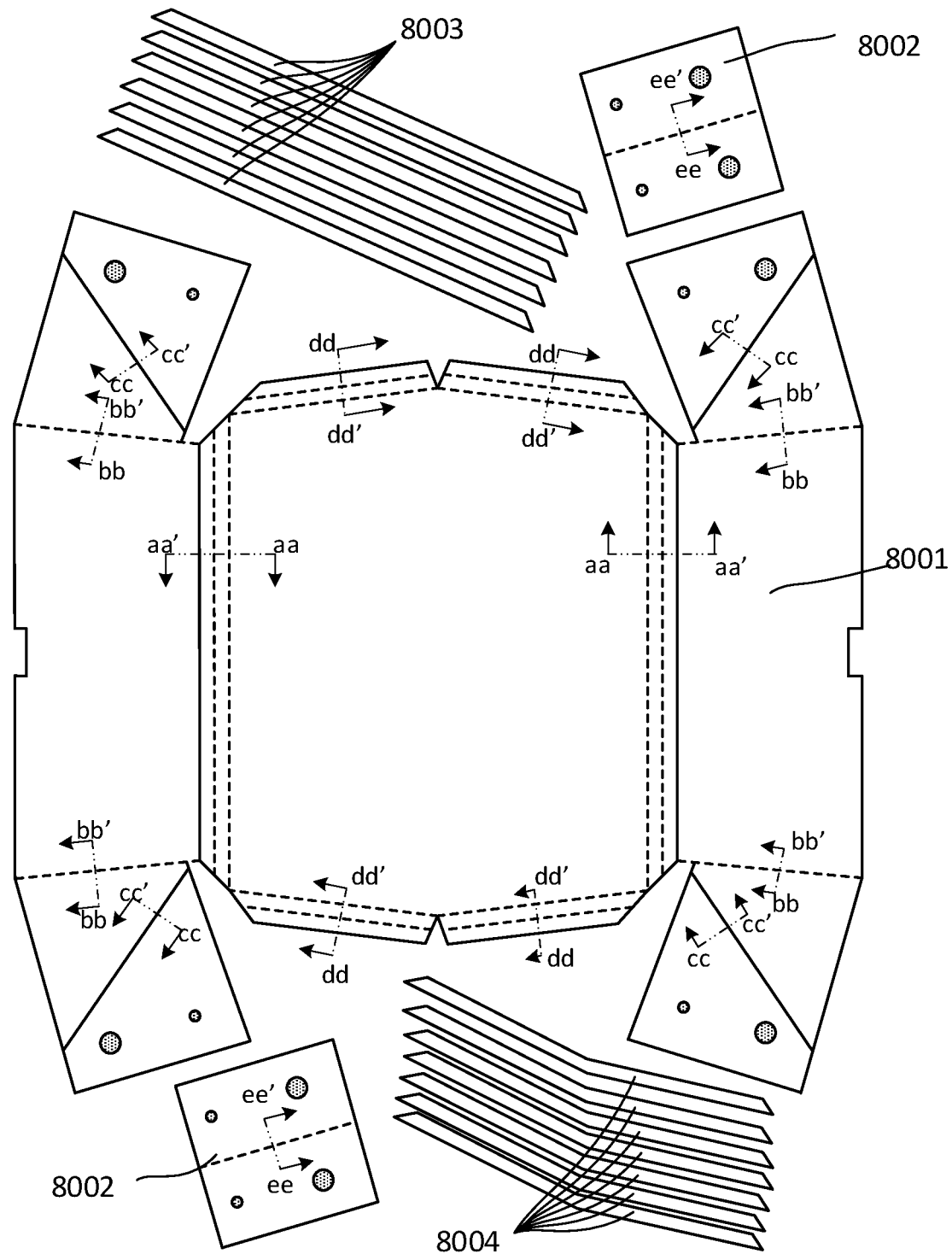
FIG. 29 is a development view that shows starting plates and members for assembling a foldable holding device according to a fifth embodiment of the present invention.

FIG. 29 is a development view that shows starting plates and members for assembling the foldable holding device that is made from a main plastic sheet 8001, sub-plastic sheets (connectors) 8002, spacers 8003 and 8004, and a carpet material or a flexible fabric sheet. A thickness of a starting plastic sheet is about 3.0 mm. The starting plastic sheet is blanked into separates pieces/sheets 8001-8004. The main plastic sheet 8001 has several creases that has a thinner thickness of about 1.0 mm than other parts. The creases are formed by cutting part of the main plastic sheet 8001 in the thickness direction to form living hinges (see FIGS. 33-37).

Figure 30:
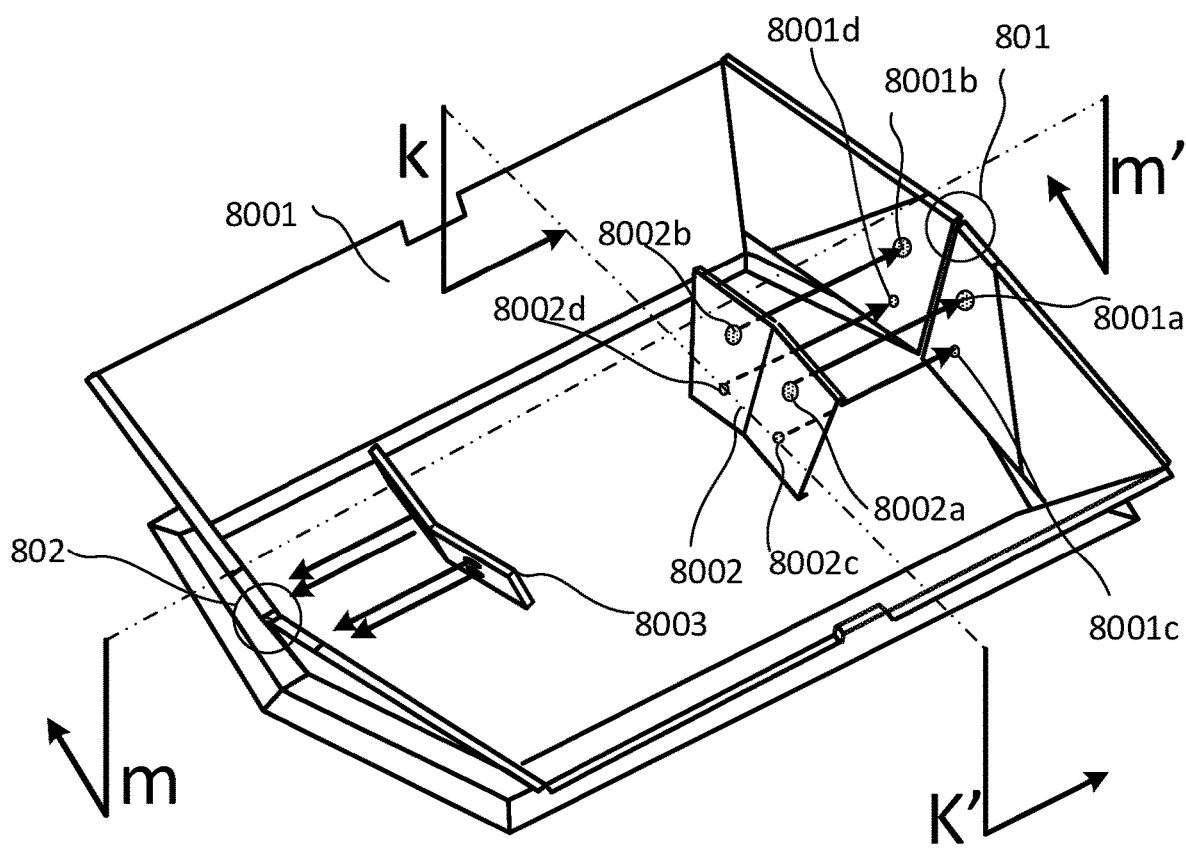
FIG. 30 is a perspective view that shows a middle process of the assembly of the foldable holding device by using the starting plates and members shown in FIG. 29 according to the fifth embodiment of the present invention.
Figure 31:
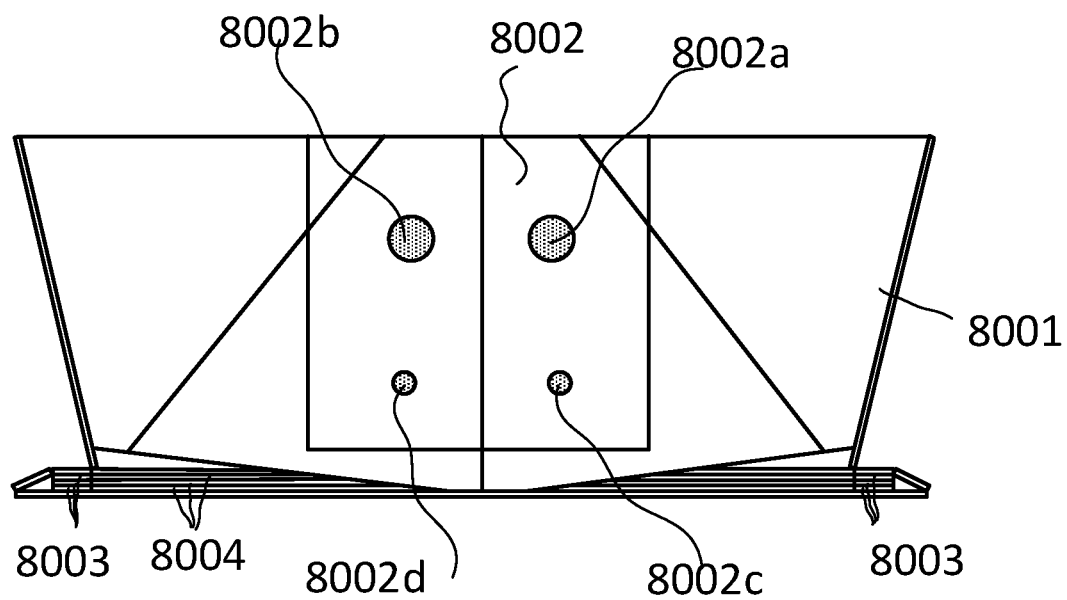
FIG. 31 is a cross section view that shows the foldable holding device in a folded state (open or assembled state) along the k-k' line shown in FIG. 30.
Figure 32:
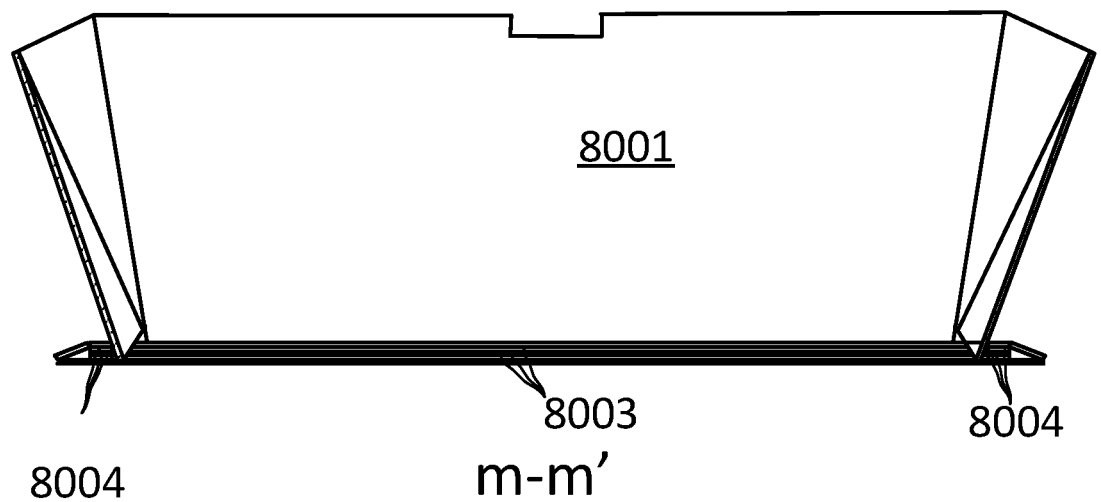
FIG. 32 is a cross section view that shows the foldable holding device in the folded state (open or assembled state) along the m-m' line shown in FIG. 30.
Figure 33:
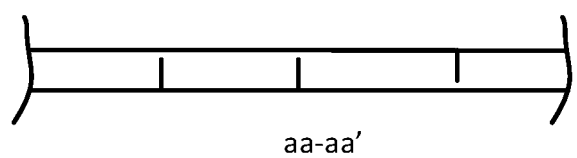
FIGS. 33-37 are cross section views that respectively show part of the foldable holding device along the aa-aa', bb-bb', cc-cc', dd-dd', and ee-ee' lines shown in FIG. 29, respectively.
Figure 36:
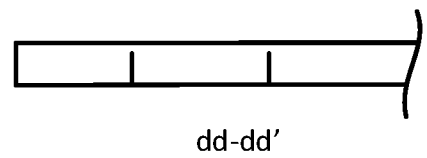
Figure 34:
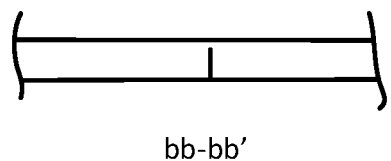
Figure 37:
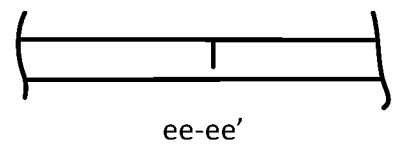
Figure 35:
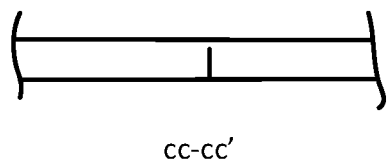

FIG. 30 is a perspective view that shows a middle process of the assembly of the foldable holding device by using the starting plates and members shown in FIG. 29. FIG. 31 is a cross section view that shows the foldable holding device in a folded state (open or assembled state) along the k-k' line shown in FIG. 30. FIG. 32 is a cross section view that shows the foldable holding device in the folded state (open or assembled state) along the m-m' line shown in FIG. 30. FIGS. 33-37 are cross section views that respectively show parts (creases) of the foldable holding device along the aa-aa', bb-bb', cc-cc', dd-dd', and ee-ee' lines shown in FIG. 29, respectively. All of pieces of plastic sheets are outwardly folded with respect to the creases to form the configuration of the foldable holding device shown in FIGS. 30, 31, and 32 and fastened by sonic welding or other fastening method with the spacers 8003, the spacers 8004, and the connectors 8002. Thereafter, the connectors 8002 are aligned with the markings, such as the marking 8001*a* to the marking 8002*a*, the marking 8001*b* to the marking 8002*b*, the marking 8001*c* to the marking 8002*c*, and the marking 8001*d* to the marking 8002*d*, and fastened by the sonic welding or other fastening method to the main plastic sheet 8001.

Further, the main plastic sheet 8001 may be laminated with a fabric sheet or a carpet prior to being blanked. Alternatively, the fabric sheet or the carpet may be adhered to the main plastic sheet 8001 after the foldable holding device is assembled.

Further, as the similar manner shown in FIGS. 11, 16, 19, 22, and 23 and as shown in FIG. 30, in the present embodiment, an inner space of the holding device in the container-shaped state (open state/raised state) that is formed with the top panels and the side panels (and the housing member (recess)) is in a hexagonal shape in the plan view. In other words, a top periphery of the foldable holding device in the raised state (open state) formed by the upper edges of the top panels and the upper edges of the side panels 115 is a hexagon in the plan view. Further, a lower periphery of the foldable holding device 110 in the open state formed by the lower edges of the top panels and the lower edges of the side panels is a hexagon in the plan view. Further, the top panels and the side panels are outwardly inclined in the open state in the plan view. Note that "hexagon" means that it may not be necessary to form a perfect shape of the hexagon by providing six vertices and sides. For example, it may be fine if such top periphery or lower periphery is in a substantially hexagon by not continuously connected by one line (including a discontinuous part). Further, as shown in FIGS. 31 and 32, part of a lower edge of one of the pair of side panels is located at an outer side of a line connecting ends of the lower edges of the raisable pair of top panels with respect to the housing member (recess) in the plan view in the open state. The lower edge of the one of the pair of side panels is configured with at least two line segments and the two line segments extend in different directions. The part of the lower edge of one of the pair of side panels abuts the housing member (recess) in the open state.

Other Variations

A configuration explained below can also be adopted to the embodiments explained above of the present invention.

In other words, in the embodiments explained above, each of the hinges 20 and 120 is formed by a thin layer of the core material 11 as a thin layer hinge, i.e., a living hinge. When the hinges 20 and 120 are formed by the thin layers of the core material as the thin layer hinge or living hinges (this is applied to all of the hinges), there is a benefit that all or at least a part of the top panels and the side panels can be integrally formed or molded. Alternatively, each of the hinges can also be formed by using the carpet material 12 or the flexible fabric components (flexible fabric sheet or cloth (sheet)). The configurations of each of the hinges are not limited to the above examples. Specifically, the hinge may also be implemented by using a flexible material or a deformable material such as a tape, such as an adhesive tape, or a plastic sheet. There is no particular limitation on the fabric components (fabric sheet or cloth (sheet)), but it is preferred that they are made of such as a flexible and durable plastic sheet (resin sheet). Thus, it is sufficient that at least left and right outer side surfaces of areas in which two parts (panels) are mutually connected are covered by the fabric components.

Further, although an illustration is omitted from the drawings, opposite surfaces of a connection part between the side wall of the housing member (recess) and one of the first top panel and the second top panel and the carpet material 12 can also be connected by an auxiliary fabric component (fabric sheet).

In each of the embodiments explained above, each of the side panels 15 and 115 is configured by four triangular sub-panels. The four triangular sub-panels include two of the first triangular side panels and two of the second triangular side panels. However, each of the side panels 15 and 115 can also be configured with a plurality of sub-panels, for instance, six or eight sub-panels. In this case, the configuration of the holding device in the plan view is in a polygonal shape with six or more vertices (sides) (such as a hexagon, a heptagon, an octagon, a nonagon, a decagon . . . ).

Figure 25:
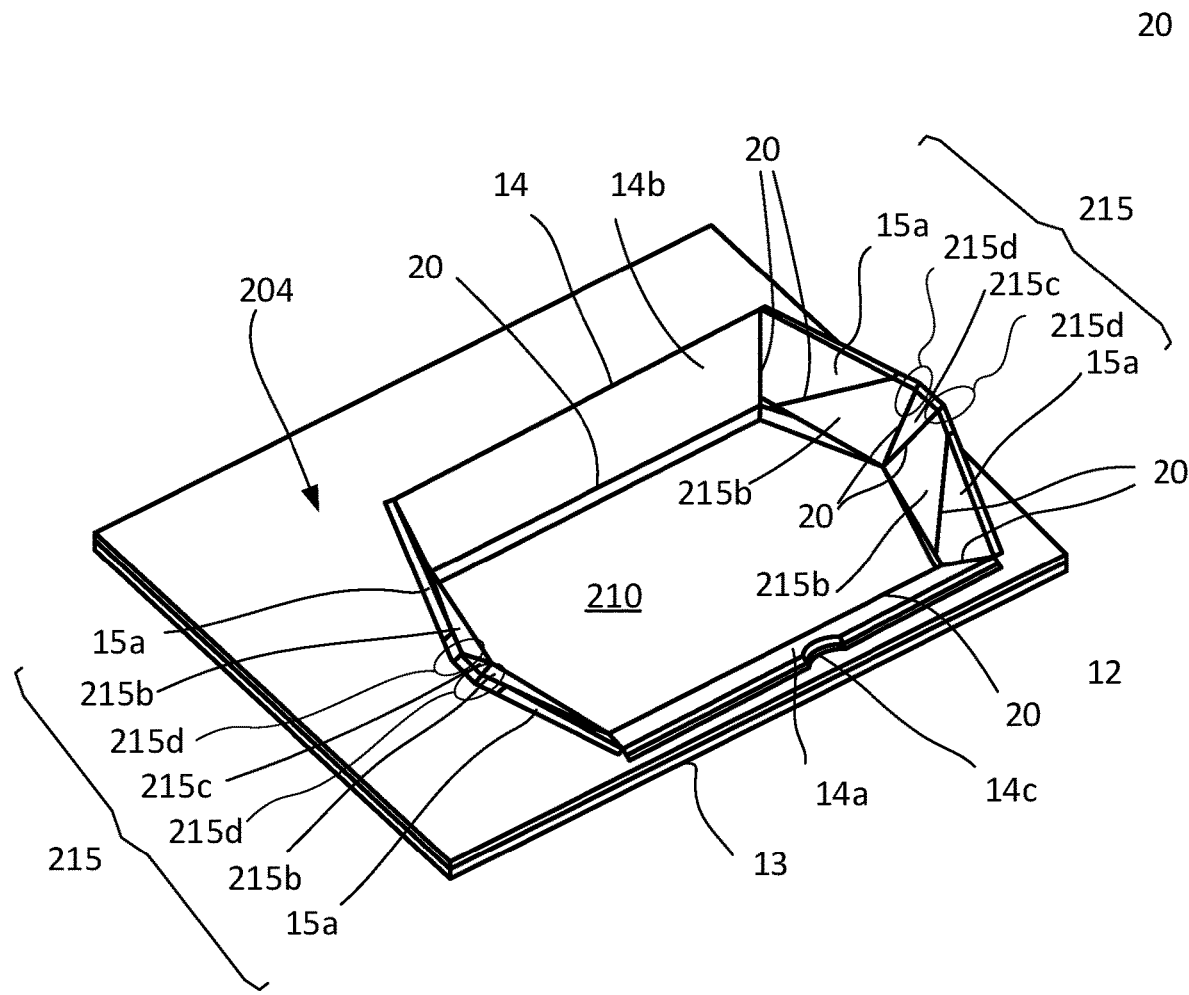
FIG. 25 is a perspective view corresponding to FIG. 5 according to the other variation of the embodiments of the present invention.

For instance, with respect to an example of a holding device, as shown in FIG. 25, a foldable holding device (holding device) 210 is provided at a floorboard 204 according to the other variation. Further, in the present embodiment below, the redundant explanations with respect to the same components shown in FIGS. 1-14 are omitted, but the same reference numbers are used for labeling. Specifically, a pair of side panels 215 is configured with five sub-panels, i.e., a pair of first triangular side panels 215*a*, a pair of second triangular side panels 215*b*, and one third triangular side panel 215*c*. In other word, the second triangular side panel 215*b* is smaller than the second triangular side panel 15*b* according to the first embodiment of the present invention. Further, the third triangular side panel 215*c* that has a triangle shape is connected between the pair of second triangular side panels 215*b* via the hinges. This part with the hinge can also have the chamfers 18 or 18' to prevent a finger pinch in the same manner as the first embodiment. In this case, the continuous upper edge of the top panels 14 and the side panels 215 is in an octagon shape in the plane view. Specifically, each of the side panels 215 has three sides to configure an octagon as an entirety of the holding device 210.

That is, as shown in FIG. 25, a top periphery of the foldable holding device 210 in the raised state (open state) formed by the upper edges of the top panels 14 and the upper edges of the side panels 215 is an octagon in the plan view. In similarly, a lower periphery of the foldable holding device 210 in the open state formed by the lower edges of the top panels 14 and the lower edges of the side panels 15 is a hexagon in the plan view. In this case, if the side panel 215*c* is formed in a rectangular shape, the lower periphery of the foldable holding device 210 in the open state formed by the lower edges of the top panels 14 and the lower edges of the side panels 15 and 215 is an octagon in the plan view in the same manner as the top periphery. Thus, the lower edge of the one of the pair of side panels is configured with three line segments and the three line segments extend in different directions. Further, the top panels 14 and the side panels 215 are outwardly inclined in the open state in the plan view.

Thus, in this variation, shapes of the top periphery and the lower periphery are different from each other (octagon and hexagon). This configuration can be applied to any of the embodiments discussed above.

In the second embodiment explained above, the notches 123 are provided in the positions shown in FIG. 24. However, the notches 123 can also be provided at the other hinge parts. Further, these notches 123 can be applied to any embodiments and variations discussed above.

The foldable holding device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A foldable holding device provided in a floorboard of a luggage compartment, the foldable holding device comprising:
    a housing member that is provided at the floorboard;
    a raisable pair of top panels that nest within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
    a pair of side panels foldably connected to the side edges of each of the raisable pair of top panels, the pair of side panels being configured to outwardly move as the raisable pair of top panels are raised and to form, together with the raisable pair of top panels, an open state of the foldable holding device,
    wherein part of a lower edge of one of the pair of side panels is located at an outer side of a line connecting ends of the lower edges of the raisable pair of top panels with respect to the housing member in a plan view in the open state, and
    the lower edge of the one of the pair of side panels is configured with at least two line segments, and the two line segments extend in different directions.

2. The foldable holding device according to claim 1, wherein the part of the lower edge of one of the pair of side panels abuts the housing member in the open state.

3. The foldable holding device according to claim 1, wherein a top periphery of the foldable holding device in the open state formed by the upper edges of the raisable pair of top panels and upper edges of the pair of side panels is a polygon with five or more vertices.

4. The foldable holding device according to claim 1, wherein a cross section of the foldable holding device in the open state is an inverted trapezoid, and
    a lower periphery of the foldable holding device in the open state formed by the lower edges of the raisable pair of top panels and the lower edges of the pair of side panels is a polygon with five or more vertices.

5. The foldable holding device according to claim 1, wherein each of the pair of side panels is configured with first and second pairs of triangular side panels,
    the first pair of triangular side panels are generally triangularly or trapezoidally shaped, and a first side edge of each of the first pair of triangular side panels is foldably connected to one of the side edges of each of the raisable pair of top panels,
    the second pair of triangular side panels are generally triangularly or trapezoidally shaped, and a first side edge of each of the second pair of triangular side panels is foldably connected to a second side edge of each of the first pair of triangular side panels, and
    second side edges of the second pair of triangular side panels are foldably connected to each other, and
    wherein the top periphery of the foldable holding device in the open state is a polygon with six or more vertices.

6. The foldable holding device according to claim 5, wherein the second side edge of each of the second pair of triangular side panels has an extended side panel that extends beyond the first side edge of each of the second pair of triangular side panels, and
    when the first side edge of each of the second pair of triangular side panels is foldably connected to the second side edge of each of the first pair of triangular side panels, the extended side panels abut the first pair of triangular side panels so as to maintain the foldable holding device in the open state.

7. The foldable holding device according to claim 1, wherein each of the raisable pair of top panels has a round cut-out next to the lower edge, and
    each of the pair of side panels has a round cut-out next to the lower edge thereof.

8. The foldable holding device according to claim 1, wherein each of the pair of side panels is configured with a plurality of triangular side panels, and
    mating faces between adjacent two side edges of the plurality of triangular side panels have a relief.

9. The foldable holding device according to claim 8, wherein a depth of the relief enlarges from lower edges toward upper edges of adjacent two of the plurality of triangular side panels.

10. The foldable holding device according to claim 8, wherein the relief is configured by first and second grooves that are provided at the adjacent two side edges of the plurality of triangular side panels, respectively, and each width of the first and second grooves is constant, and
    the first and second grooves are formed between an intermediate position of the mating faces and the upper edges of the adjacent two side edges of the plurality of triangular side panels.

11. The foldable holding device according to claim 1, wherein one of the raisable pair of top panels has a locking member, and the other of the raisable pair of top panels has a locked member,
    the foldable holding device is locked by securing the locking member to the locked member in the housed state.

12. The foldable holding device according to claim 1, wherein each of the pair of side panels is configured with two sub-side panels, and
    mating side edges of the two sub-side panels are movably connected by a flexible fabric sheet, and the flexible fabric sheet is disposed at an inner side of the two sub-side panels located at an inner space of the housing member.

13. The foldable holding device according to claim 12, wherein each of the mating edges of the two sub-side panels has a projection at an outer side opposite to the inner side of the two sub-side panels.

14. The foldable holding device according to claim 5,
wherein the second side edges of the second pair of triangular side panels are connected by a living hinge, and the living hinge is located at a side facing the housing member, and
when the foldable holding device is in the open state, the living hinge is configured to maintain the open state.

15. The foldable holding device according to claim 5,
wherein the second side edges of the second pair of triangular side panels are connected by a living hinge, and the living hinge is located at a side facing away from the housing member, and
when the foldable holding device is in the open state, the living hinge is configured to maintain the open state.

16. A foldable holding device provided on a floorboard of a luggage compartment, the foldable holding device comprising:
a housing member that is detachably provided on the floorboard;
a raisable pair of top panels that nest within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair of top panels, the pair of side panels being configured to outwardly move as the raisable pair of top panels are raised and to form, together with the raisable pair of top panels, an open state of the foldable holding device,
wherein part of a lower edge of one of the pair of side panels is located at an outer side of a line connecting ends of the lower edges of the raisable pair of top panels with respect to the housing member in a plan view in the open state,
the lower edge of the one of the pair of side panels is configured with at least two line segments, and the two line segments extend in different directions.

17. The foldable holding device according to claim 16,
wherein the part of the lower edge of one of the pair of side panels abuts the housing member in the open state.

18. The foldable holding device according to claim 16,
wherein a top periphery of the foldable holding device in the open state formed by the upper edges of the raisable pair of top panels and upper edges of the pair of side panels is a polygon with five or more vertices.

19. The foldable holding device according to claim 16,
wherein a cross section of the foldable holding device in the open state is an inverted trapezoid, and
a lower periphery of the foldable holding device in the open state formed by the lower edges of the raisable pair of top panels and the lower edges of the pair of side panels is a polygon with five or more vertices.

20. The foldable holding device according to claim 16,
wherein each of the pair of side panels is configured with first and second pairs of triangular side panels,
the first pair of triangular side panels are generally triangularly or trapezoidally shaped, and a first side edge of each of the first pair of triangular side panels is foldably connected to one of the side edges of each of the raisable pair of top panels,
the second pair of triangular side panels are generally triangularly or trapezoidally shaped, and a first side edge of each of the second pair of triangular side panels is foldably connected to a second side edge of each of the first pair of triangular side panels, and
second side edges of the second pair of triangular side panels are foldably connected to each other, and
wherein the top periphery of the foldable holding device in the open state is a polygon with six or more vertices.

21. The foldable holding device according to claim 20,
wherein the second side edge of each of the second pair of triangular side panels has an extended side panel that extends beyond the first side edge of each of the second pair of triangular side panels, and
when the first side edge of each of the second pair of triangular side panels is foldably connected to the second side edge of each of the first pair of triangular side panels, the extended side panels abut the first pair of triangular side panels so as to maintain the foldable holding device in the open state.

22. The foldable holding device according to claim 16,
wherein each of the pair of side panels is configured with a plurality of triangular side panels, and
mating faces between adjacent two side edges of the plurality of triangular side panels have a relief.

23. The foldable holding device according to claim 22,
wherein a depth of the relief enlarges from lower edges toward upper edges of adjacent two of the plurality of triangular side panels.

24. The foldable holding device according to claim 22,
wherein the relief is configured by first and second grooves that are provided at the adjacent two side edges of the plurality of triangular side panels, respectively, and each width of the first and second grooves is constant, and
the first and second grooves are formed between an intermediate position of the mating faces and the upper edges of the adjacent two side edges of the plurality of triangular side panels.

25. The foldable holding device according to claim 16,
wherein one of the raisable pair of top panels has a locking member, and the other of the raisable pair of top panels has a locked member,
the foldable holding device is locked by securing the locking member to the locked member in the housed state.

26. The foldable holding device according to claim 16,
wherein an entirety of an upper surface of the foldable holding device in the housed state is covered by a flexible fabric sheet, and
the flexible fabric sheet continuously extends onto a periphery of a bottom surface of the foldable holding device.

27. The foldable holding device according to claim 20,
wherein the second side edges of the second pair of triangular side panels are connected by a living hinge, and the living hinge is located at a side facing the housing member, and
when the foldable holding device is in the open state, the living hinge is configured to maintain the open state.

28. The foldable holding device according to claim 20,
wherein the second side edges of the second pair of triangular side panels are connected by a living hinge, and the living hinge is located at a side facing away from the housing member, and
when the foldable holding device is in the open state, the living hinge is configured to maintain the open state.

29. The foldable holding device according to claim 16,
wherein each of the raisable pair of top panels has a round cut-out next to the lower edge, and
each of the pair of side panels has a round cut-out next to a lower edge thereof.

30. The foldable holding device according to claim 16, wherein a bottom of the foldable holding device is detachable to the floorboard via a hook and loop fastener.

31. A foldable holding device provided in a back side of a seat, the foldable holding device comprising:
a housing member that is provided at the back side of the seat;
a raisable pair of top panels that nest within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair of top panels, the pair of side panels being configured to outwardly move as the raisable pair of top panels are raised and to form, together with the raisable pair of top panels, an open state of the foldable holding device,
wherein part of a lower edge of one of the pair of side panels is located at an outer side of a line connecting ends of the lower edges of the raisable pair of top panels with respect to the housing member in a plan view in the open state,
the lower edge of the one of the pair of side panels is configured with at least two line segments, and the two line segments extend in different directions.

32. The foldable holding device according to claim 31, wherein the part of the lower edge of one of the pair of side panels abuts the housing member in the open state.

33. The foldable holding device according to claim 31, wherein a top periphery of the foldable holding device in the open state formed by the upper edges of the raisable pair of top panels and upper edges of the pair of side panels is a polygon with five or more vertices.

34. The foldable holding device according to claim 31, wherein a cross section of the foldable holding device in the open state is an inverted trapezoid, and
a lower periphery of the foldable holding device in the open state formed by the lower edges of the raisable pair of top panels and the lower edges of the pair of side panels is a polygon with five or more vertices.

35. The foldable holding device according to claim 31, wherein each of the pair of side panels is configured with first and second pairs of triangular side panels,
the first pair of triangular side panels are generally triangularly or trapezoidally shaped, and a first side edge of each of the first pair of triangular side panels is foldably connected to one of the side edges of each of the raisable pair of top panels,
the second pair of triangular side panels are generally triangularly or trapezoidally shaped, and a first side edge of each of the second pair of triangular side panels is foldably connected to a second side edge of each of the first pair of triangular side panels, and
second side edges of the second pair of triangular side panels are foldably connected to each other,
wherein the top periphery of the foldable holding device in the open state is a polygon with six or more vertices.

36. The foldable holding device according to claim 35, wherein the second side edge of each of the second pair of triangular side panels has an extended side panel that extends beyond the first side edge of each of the second pair of triangular side panels, and
when the first side edge of each of the second pair of triangular side panels is foldably connected to the second side edge of each of the first pair of triangular side panels, the extended side panels abut the first pair of triangular side panels so as to maintain the foldable holding device in the open state.

37. The foldable holding device according to claim 35, wherein the second side edges of the second pair of triangular side panels are connected by a living hinge, and the living hinge is located at a side facing the housing member, and
when the foldable holding device is in the open state, the living hinge is configured to maintain the open state.

38. The foldable holding device according to claim 35, wherein the second side edges of the second pair of triangular side panels are connected by a living hinge, and the living hinge is located at a side facing away from the housing member, and
when the foldable holding device is in the open state, the living hinge is configured to maintain the open state.

39. The foldable holding device according to claim 31, wherein each of the raisable pair of top panels has a round cut-out next to the lower edge, and
each of the pair of side panels has a round cut-out next to a lower edge thereof.

40. The foldable holding device according to claim 31, wherein one of the raisable pair of top panels has a locking member, and the other of the raisable pair of top panels has a locked member,
the foldable holding device is locked by securing the locking member to the locked member in the housed state.

* * * * *